(12) United States Patent
Lang et al.

(10) Patent No.: US 10,834,258 B2
(45) Date of Patent: *Nov. 10, 2020

(54) COMMUNICATIONS NETWORK FOR SCREENING AND SELECTIVELY BLOCKING PRIVATE CALLS

(71) Applicants: AT&T Intellectual Property I, L.P., Atlanta, GA (US); AT&T Mobility II LLC, Atlanta, GA (US)

(72) Inventors: Howard L. Lang, Wayside, NJ (US); Vanda Oliveira, Seattle, WA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,110

(22) Filed: Feb. 28, 2020

(65) Prior Publication Data
US 2020/0204678 A1 Jun. 25, 2020

Related U.S. Application Data

(63) Continuation of application No. 16/050,518, filed on Jul. 31, 2018, now Pat. No. 10,582,051.

(51) Int. Cl.
*H04M 3/436* (2006.01)
*H04M 3/42* (2006.01)

(52) U.S. Cl.
CPC ..... *H04M 3/4365* (2013.01); *H04M 3/42042* (2013.01); *H04M 3/42059* (2013.01)

(58) Field of Classification Search
None
See application file for complete search history.

(56) References Cited

U.S. PATENT DOCUMENTS

| 6,647,106 B1 | 11/2003 | Hussain et al. |
| 7,027,569 B2 | 4/2006 | Price |
| 7,440,564 B2 | 10/2008 | Hill et al. |

(Continued)

OTHER PUBLICATIONS

U.S. Office Action dated Sep. 18, 2018 in U.S. Appl. No. 16/050,518.

(Continued)

*Primary Examiner* — Antim G Shah
(74) *Attorney, Agent, or Firm* — Hartman & Citrin LLC

(57) ABSTRACT

Concepts and technologies are disclosed herein for screening and selectively blocking private calls. A processor executing instructions associated with a private call blocking service can detect a call from a calling device directed to a called device. The processor can determine that the call has a caller identification blocking marker indicating that a fixed label should be provided to the called device to prevent the called device from presenting caller identification data associated with the calling device. In response to determining that the call has the caller identification blocking marker, the processor can obtain a custom private caller identification mask instead of the fixed label. The processor can provide the custom private caller identification mask to the called device for the call, where the custom private caller identification mask can be presented to a called party associated with the called device without revealing the caller identification data.

20 Claims, 10 Drawing Sheets

(56) References Cited

U.S. PATENT DOCUMENTS

| | | |
|---|---|---|
| 7,751,855 B2 | 7/2010 | Cai |
| 8,090,088 B2 | 1/2012 | Mullis et al. |
| 8,638,921 B2 | 1/2014 | Kirkpatrick |
| 9,060,057 B1 * | 6/2015 | Danis ................ H04M 3/42059 |
| 9,462,122 B1 | 10/2016 | Bates |
| 9,819,797 B2 | 11/2017 | Sharpe |
| 10,582,051 B2 * | 3/2020 | Lang ................... H04M 3/4365 |
| 2006/0193453 A1 | 8/2006 | Price |
| 2007/0201651 A1 | 8/2007 | Bontempi |
| 2008/0089501 A1 * | 4/2008 | Benco ................... H04M 15/06 |
| | | 379/142.01 |

OTHER PUBLICATIONS

U.S. Office Action dated Apr. 26, 2019 in U.S. Appl. No. 16/050,518.
U.S. Notice of Allowance dated Sep. 25, 2019 in U.S. Appl. No. 16/050,518.

* cited by examiner

COMMUNICATIONS NETWORK FOR SCREENING AND SELECTIVELY BLOCKING PRIVATE CALLS

CROSS-REFERENCE TO RELATED APPLICATIONS

This application is a continuation of and claims priority to U.S. patent application Ser. No. 16/050,518, entitled "Communications Network for Screening and Selectively Blocking Private Calls," filed Jul. 31, 2018, now U.S. Pat. No. 10,582,051, which is incorporated herein by reference in its entirety.

BACKGROUND

Over the past several years, communication devices have become prevalent, whether fixed line, mobile, or even implemented as programs running in web browsers. Because of the prevalence of these devices, modern users may almost always be considered available and/or capable of engaging in various audio and/or visual communication, irrespective of whether the user is available.

Users of communication devices can receive many calls per day at times when, although convenient for the caller, may not be convenient for the user that is the intended recipient of the calls. Increasingly, a growing number of calls originate from a calling party with the intent to obfuscate or mislead (e.g., from spammers and/or nefarious commercial entities), and thus it may never be convenient for the user to accept those calls. Repeated calls of this nature can lead a user to only answer calls when the user believes they know and/or are familiar with the identity of the calling party. As such, legitimate, innocuous callers—who are unknown or unfamiliar to the caller but who are making bona fide calls that the user would otherwise accept—may have their calls ignored or denied, thereby leaving the legitimate caller with less avenues to contact the user.

SUMMARY

The present disclosure is directed to a communications network service, such as a private call blocking service, that can configure one or more components of a communications network to handle, identify, intercept, block, reconfigure, and route or otherwise screen calls. The private call blocking service is further configured to prompt actions by other processors, servers, and/or entities. As used herein, the term "call" is intended to refer to a communication that is directed to a specific communication device for presentation by the communication device. The term "communication" is intended to refer to a message and/or file that provides audio data (e.g., via data packets) and/or visual data (e.g., through moving and/or still images) to the communication device. A call can include an audio call, a video call, an audio voicemail message, a visual voicemail message, and/or other live or recorded communications that provide speech, sound, and/or video messages to a user through a communication device. The private call blocking service can be hosted or executed by a computer system, such as a call handling system. In some embodiments, the computer system executing the private call blocking service can be located within and/or in communication with a communications network that routes a call and is in communication with the communication device that is the intended recipient of the call. The private call blocking service can be interacted with by a user or other input provider (e.g., an administrator, a customer, or other user using a user device or other non-generic device) to submit private call management data to the private call blocking service. The private call management data can be obtained, retrieved, or otherwise received by the private call blocking service and used by the private call blocking service to generate, update, alter, modify, apply or otherwise implement one or more custom private caller identification masks to a private call. A call may be considered a "private call" when caller identification data is blocked and/or requested to be blocked.

After a call is initiated by the calling party, the private call blocking service can detect that the call is being routed, sent or otherwise directed to a called device. In various embodiments, the call can be detected by the private call blocking service as the call is being routed or otherwise sent through and/or from a communications network, a network interface, an Internet protocol multimedia subsystem ("IMS"), a proxy call session control function ("PCSCF"), and/or other network entities in response to the call being placed for the called device. The private call blocking service can obtain, such as from a communication device, the network, or other network entity, caller identification ("caller ID") data associated with the call, one or more custom private caller identification mask, and/or other data from one or more storage devices that may be relevant to the call. A custom private caller identification mask may be implemented by the private call blocking service when an incoming call from a calling device is determined to be a private call based on an indication to block caller ID data corresponding to the calling device and/or calling party. In some embodiments, the indication to block caller ID data can include, but should not be limited to, the presence of a caller identification blocking marker. As such, the phrase "custom private caller identification mask" can include instructions and/or data for transforming and/or reconfiguring private calls such that a dynamic alphanumeric string can be created by and/or implemented specifically for—and thus can be unique to—a called device for a particular calling party and/or calling device associated with a private call so as to enable and provide presentation of the dynamic alphanumeric string as an identity for the calling party and/or calling device when a private call from the calling party and/or calling device is received without revealing the caller ID data to the called device. Use of the custom private caller identification mask can also enable and provide selective blocking of a private call. The private call blocking service can create commands and/or trigger actions or requests to other entities, processors, or the like in order to screen, handle, and enable selective blocking of the calls.

The private call blocking service can use the caller identification data of an incoming call and the data from the storage devices to analyze the identity provided and/or portrayed by the calling party to determine how the incoming call is to be handled. The private call blocking service can provide selective blocking of private calls based on one or more instructions from a called device. In some embodiments, the one or more instructions can allow private calls to continue to the called party using a custom private caller ID mask and/or disallow one or more private calls irrespective of the use of a custom private caller ID mask. In some embodiments, the private call blocking service can block, reroute, and/or or alter handling one or more private calls from reaching one or more called devices by issuing a call handling command to the network. For example, in some embodiments, the call handling command can be issued to components of the network, such as the PCSCF of the IMS within the network, in order to effect the handling of the call, and/or, if specified, the command can, in some embodiments, be a block command that directs the network to drop, deny, or otherwise not fulfill the call to the called device.

According to one aspect of the concepts and technologies disclosed herein, a method is disclosed. In some embodiments, the method can include detecting, by a processor of a system, a call from a calling device directed to a called device. The method can further include determining, by the processor, that the call has a caller identification blocking marker, where the caller identification blocking marker indicates that a fixed label should be provided to the called device so as to prevent the called device from presenting caller identification data associated with the calling device. The method can further include obtaining, by the processor, a custom private caller identification mask instead of the fixed label. In some embodiments, obtaining the custom private caller identification mask can occur in response to determining that the call has the caller identification blocking marker. The method can further include providing, by the processor, the custom private caller identification mask to the called device for the call, where the custom private caller identification mask is presented to a called party associated with the called device without revealing the caller identification data.

In some embodiments, the method can also include accessing, by the processor, a private call blocking map, and identifying, by the processor, the custom private caller identification mask within the private call blocking map based on called party identification data associated with the called device. The caller identification blocking marker can indicate that the caller identification data should not be provided and/or presented to the called device. In some embodiments, the fixed label can be configured to indicate one or more of private, anonymous, unknown, or unavailable. In some embodiments, the method can also include replacing, by the processor, for the call, the fixed label with the custom private caller identification mask. In some embodiments, the method can also include receiving, by the processor, a customization message that comprises a mask alteration instruction that configures the custom private caller identification mask to present a unique private caller identification on the called device for calls made by the calling device.

In some embodiments, the method can also include determining, by the processor, that the called device has provided a selective private call block instruction for future calls corresponding to the custom private caller identification mask. In some embodiments, the private call block instruction can indicate that future calls from the calling device associated with the caller identification data should be prevented from reaching the called device. The future calls that should be prevented from reaching the called device may present the caller identification blocking marker. In some embodiments, the private call block instruction can prevent future calls from reaching the called device when the caller identification blocking marker is present or, in some embodiments, irrespective of whether the future calls have the caller identification blocking marker. In some embodiments, the method can also include preventing, by the processor, the future calls from being provided to the called device based on the selective private call block instruction. In some embodiments, the custom private caller identification mask is unique to the called device. In some embodiments, an instance of the custom private caller identification mask is associated with one or more of the calling device, the caller identification data, called identification data, and/or the called device so as to render the custom private caller identification mask unique to the called device, and such that a different private caller identification mask is used when another call from the calling device is directed to another called device.

According to another aspect of the concepts and technologies disclosed herein, a system is disclosed. The system can include a processor and a memory. The memory can store computer-executable instructions that, when executed by the processor, cause the processor to perform operations. The operations can include detecting a call from a calling device directed to a called device. The operations can include determining that the call has a caller identification blocking marker, wherein the caller identification blocking marker indicates that a fixed label should be provided to the called device so as to prevent the called device from presenting caller identification data associated with the calling device. The operations can include obtaining a custom private caller identification mask instead of the fixed label. In some embodiments, obtaining a custom private caller identification mask can occur in response to determining that the call has the caller identification blocking marker. The operations can include providing the custom private caller identification mask to the called device for the call, where the custom private caller identification mask can be presented to a called party associated with the called device without revealing the caller identification data.

In some embodiments, the operations can also include accessing a private call blocking map, and identifying the custom private caller identification mask within the private call blocking map based on called party identification data associated with the called device. In some embodiments, the fixed label is configured to indicate one or more of private, anonymous, unknown, or unavailable. In some embodiments, the operations can also include replacing, for the call, the fixed label with the custom private caller identification mask. In some embodiments, the operations can also include receiving a customization message that comprises a mask alteration instruction that configures the custom private caller identification mask to present a unique private caller identification on the called device for calls made by the calling device. In some embodiments, the operations can also include determining that the called device has provided a selective private call block instruction for future calls corresponding to the custom private caller identification mask. In some embodiments, the private call block instruction can indicate that future calls from the calling device associated with the caller identification data should be prevented from reaching the called device irrespective of whether the future incoming calls have the caller identification blocking marker. In some embodiments, the method can also include preventing the future calls from being provided to the called device based on the selective private call block instruction. In some embodiments, the custom private caller identification mask is unique to the called device.

According to yet another aspect, a computer storage medium is disclosed. The computer storage medium can have computer-executable instructions stored thereon. The computer-executable instructions can be associated with a private call blocking service of a communications network. When the computer-executable instructions are executed by a processor, the processor can perform operations. In some embodiments, the processor can be included in a computer system that supports the private call blocking service. The operations can include detecting a call from a calling device directed to a called device. The operations can further include determining that the call has a caller identification blocking marker, where the caller identification blocking marker indicates that a fixed label should be provided to the called device so as to prevent the called device from presenting caller identification data associated with the calling device. The operations can also include obtaining a custom private caller identification mask instead of the fixed label. In some embodiments, obtaining a custom private caller identification mask can occur in response to determining that the call has the caller identification blocking marker. The operations also can include providing the custom private caller identification mask to the called device for the call, wherein the custom private caller identification mask is presented to a called party associated with the called device without revealing the caller identification data.

In some embodiments, the operations can also include accessing a private call blocking map, and identifying the custom private caller identification mask within the private call blocking map based on called party identification data associated with the called device. In some embodiments, the fixed label is configured to indicate one or more of private, anonymous, unknown, or unavailable. In some embodiments, the operations can also include replacing, for the call, the fixed label with the custom private caller identification mask. In some embodiments, the operations can also include receiving a customization message that comprises a mask alteration instruction that configures the custom private caller identification mask to present a unique private caller identification on the called device for calls made by the calling device. In some embodiments, the operations can also include determining that the called device has provided a selective private call block instruction for future calls corresponding to the custom private caller identification mask. In some embodiments, the private call block instruction can indicate that future calls from the calling device associated with the caller identification data should be prevented from reaching the called device irrespective of whether the future calls have the caller identification blocking marker. In some embodiments, the operations can also include preventing the future calls from being provided to the called device based on the selective private call block instruction.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
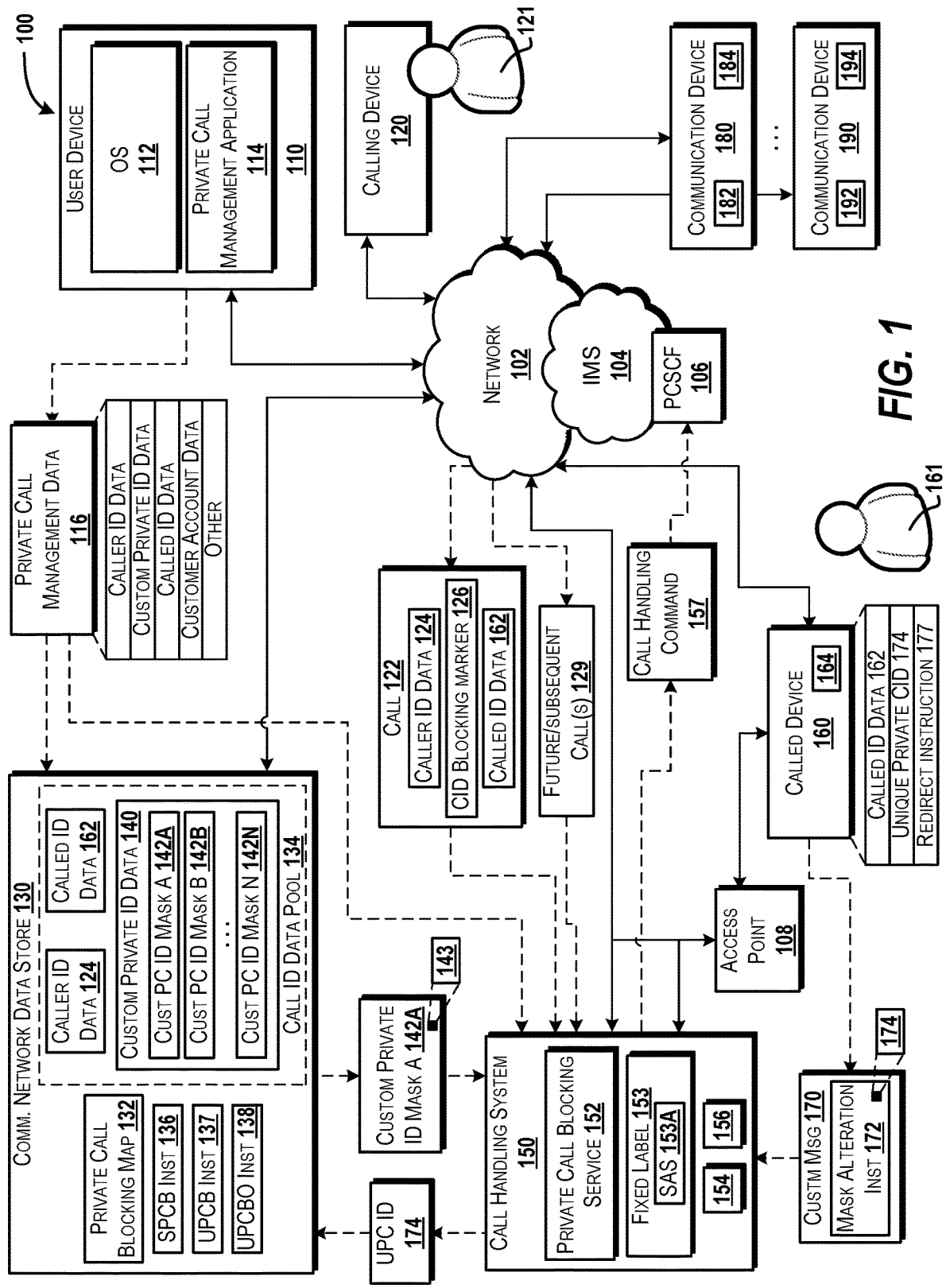
FIG. 1 is a system diagram showing an illustrative operating environment for various embodiments of the concepts and technologies described herein.

The following detailed description is directed to a private call blocking service that is configured to enable selective handling and blocking of private calls that withhold, block, or otherwise prevent caller identification ("caller ID") data from being provided to a called device and presented to a called party via the called device. The private call blocking service can also be configured to enable customized private call identification of the private call through the use of a custom private caller ID mask such that the called device is instructed to present the custom private caller ID mask so as to enable the called party to distinguish between private calls. A calling party can provide caller ID data via a communication service available in analog and/or digital communication systems, as well as in internet protocol ("IP") networks that support voice over Internet Protocol (VoIP) applications. Caller ID data is intended to provide identifying information (e.g., a name, telephone number, etc.) about the calling party to the called party through presentation of the caller ID data. The caller ID data can be provided by a communication device and/or network component associated with the calling party (referred to as the "calling device") and directed to a communication device of the called party (referred to as the "called device"). In some embodiments, the caller ID data may be presented by the called device as an audio and/or visual presentation of identifying information associated with the calling party and/or calling device, such as through presentation by a user interface of a display on the called device, announcement via an audio speaker of the called device, and/or other presentation by the called device.

In some instances, the calling party may seek to block or prevent their caller ID data from being presented to the called party via the called device. For example, in some embodiments, the calling party may provide input that specifically instructs the calling device to place a call to the called device, but requests that the called ID data associated with the calling device and/or the calling party be blocked, withheld, or otherwise not provided to the called device. In some embodiments, the input to block caller ID data may precede the input of a contact address for the call, such as but not limited to, an input of "*67" preceding the input of a telephone number used to place the call, an input that toggles a "block caller ID" button on a user interface when placing an internet protocol ("IP") call that provides an audio and/or video session, or a predefined input stored remotely from the calling device (e.g., in a data storage device of the network) that automatically triggers blocking of caller ID data when a call is placed by the calling device. It should be understood that the examples provided are for illustration purposes only, and therefore should not be construed as limiting in any way.

When a call requests or otherwise indicates that the caller ID data associated with the calling device and/or the calling party should be blocked or otherwise not provided to the called device and/or called party, then the caller ID data included with the call will not be provided to the called device, and thus none of the caller ID data included with the call will be provided to and/or received and presented by the called device. Thus, in conventional systems, when caller ID data for the call is blocked or otherwise not provided to the called device, then the called device may not reveal the identity or any other information about the calling party and/or the calling device. Instead, in some embodiments where no caller ID data is provided to the called device, the called device may indicate or otherwise alert the called party about the call and provide call information via a fixed label on a display that may be presented as "PRIVATE," "CALLER ID BLOCKED," "ANONYMOUS," "UNAVAILABLE," "UNKNOWN CALLER," "WIRELESS CALLER," or any other information that does not provide distinguishable identification. By this, when a call from a calling device and/or calling party directed to a called device requests caller ID blocking or otherwise does not allow or provide caller ID data associated with the calling device and/or calling party to be provided to the called device, then the call may be considered and/or referred to as a "private call." Without information to identify and/or distinguish the calling party associated with the private call, the called party may not be able to distinguish a calling party and/or a calling device that is legitimate, known, and/or innocuous from other calling parties who may be nefarious, deceptive, and/or illegitimate. Moreover, in some instances, the called party may know and trust different calling parties that each place private calls to the called device, but conventional systems may not allow the called party to identify, much less distinguish, the calling party corresponding with each private call.

Embodiments of the present disclosure provide a private call blocking service that can screen for private calls that indicate caller ID blocking, generate a custom private caller ID mask based on the caller ID data for the calling device and called ID data for the called device, and provide the custom private caller ID mask such that the called device is instructed to present the custom private caller ID mask that provides identification of the calling party and/or distinguishing information about the calling device and/or calling party corresponding to the private call. The private call blocking service can provide the custom private caller ID mask to the called device without providing the caller ID data to the called device for the private call. Thus, although the called device is not provided the caller ID data associated with the calling device and/or the fixed label, the custom private caller ID mask can distinguish and/or differentiate the private call so as to enable the called party and/or called device the opportunity to handle the private call uniquely and/or differently than other private calls from other calling devices. In some embodiments, the private call blocking service can handle each private call in a unique manner, such as by one or more of providing a custom private caller ID mask created specifically for the called device based on the caller ID data and called ID data of the calling device such that a customizable label is presented instead of the fixed label, selectively blocking one or more private calls from a called party, and/or performing another call handling action, such as but not limited to redirecting some or all private calls sent from any calling device to a voicemail system, or selectively routing private calls that are associated with caller ID data from a particular calling device to a voicemail system so as to prompt the calling party to leave a voicemail. In some embodiments, when a call handling action is implemented by the private call blocking service (e.g., during and/or in response to a redirect instruction that routes a private call to a voicemail system), the private call blocking service can provide a custom private caller ID mask to the called device to inform the called party that the call handling action was performed, where the custom private caller ID mask can be provided without the called device receiving the private call and/or the caller ID data associated with the calling device. In some embodiments, the private call blocking service can configure a custom private caller ID mask specifically for the private call so as to enable the called device to provide instructions as to how the current and/or future private calls should be handled (e.g., whether a call handling action should be performed).

For example, in some embodiments, the private call blocking service can enable (e.g., via the custom private caller ID mask) the called device to provide a selective private call block instruction to selectively block a private call corresponding to the custom private caller ID mask being presented by the called device. The private call blocking service can use the selective private call block instruction corresponding to the custom private caller ID mask that was presented to detect future private calls directed to the called device and which are associated with the caller ID data, calling device, and/or calling party in order to selectively block or otherwise prevented the private call from being provided to the called device and/or called party based on the selective private call block instruction. By this, the private call blocking service can allow some private calls to be provided to the called device using a custom private caller ID mask so long as an instance of the selective private call block instruction is not assigned or otherwise applied to private calls that would use the custom private caller ID mask. In some embodiments, the private call blocking service can impose a universal private call block instruction such that any private call that is intended for the called device will (or may) be blocked and prevented from reaching the called device unless the called device provides a selective private call block override instruction that instructs the private call blocking service to exempt, from the universal private call block instruction, private calls which are associated with certain caller ID data, a certain calling device, and/or a certain calling party. In some embodiments, the private call blocking service can configure a custom private caller ID mask that enables the called device to provide an instruction to prevent a future private call from reaching the called device and divert the future private call to a voicemail system such that the called party can screen an identity of the calling party associated with the future private call without the called device receiving the caller ID data associated with the calling device. These and other aspects of the concepts and technologies disclosed herein will be illustrated and described in more detail below.

While some of the subject matter described herein may occasionally be presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types in response to execution on a processor. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and other particularized, non-generic machines.

Referring now to FIG. 1, aspects of an operating environment 100 for various embodiments of the concepts and technologies disclosed herein for providing and using a private call blocking service will be described, according to an illustrative embodiment. The operating environment 100 shown in FIG. 1 includes a user device 110 operating in communication with and/or as part of a communications network ("network") 102. The operating environment 100 also includes an Internet Protocol multimedia ("IMS") subsystem 104, a proxy call session control function ("PCSCF") 106, an access point 108, a calling device 120, a communication network data store 130, a call handling system 150, a called device 160, a communication device 180, and a communication device 190.

According to various embodiments, the functionality of the user device 110 may be provided by one or more server computers, desktop computers, mobile telephones, smartphones, tablet computers, laptop computers, smart watches, web browsers (e.g., browser-based implementations of communication devices), set-top boxes, vehicle computing systems, other computing systems, and the like. It should be understood that the functionality of the user device 110 can be provided by a single device, by two or more similar devices, and/or by two or more dissimilar devices. For purposes of describing the concepts and technologies disclosed herein, the user device 110 is described herein as a communication device, such as a smartphone. In some embodiments, the user device 110 can be embodied by an instance of a computing system or a communication device, which are discussed below with respect to FIG. 6 and FIG. 7. It should be understood that this embodiment is illustrative, and should not be construed as being limiting in any way.

The user device 110 can execute an operating system 112 and one or more application programs such as, for example, a private call management application 114. The operating system 112 can be a computer program or other computer-executable instructions for controlling the operation of the user device 110. The private call management application 114 can be an executable program configured to execute on top of the operating system 112 to provide various functions as illustrated and described herein for interacting with and/or using a private call blocking service. According to various embodiments, the functionality of the private call management application 114 can be provided by a web browser, a web application, a website, a software as a service, and/or a standalone application. Thus, it can be appreciated that a web browser application can execute instructions to provide the functionality illustrated and described herein. Because the application programs can include other applications that are generally understood (e.g., mail programs, messaging programs, web browsing programs, standalone applications, combinations thereof, or the like), the example embodiment shown in FIG. 1 should not be construed as being limiting in any way the concepts and technologies described herein. It is understood that the private call management application 114 may be stored, executed, accessed, and/or implemented from other devices within the operating environment 100, such as but not limited to the calling device 120, the called device 160, the communication device 180, the communication device 190, or another device that may be accessed by a user. It should be understood that the examples provided are for illustration purposes only, and therefore should not be construed as limiting in any way.

The private call management application 114 can be configured to interact with an application, a program, a software module (i.e., a defined set of callable computing instructions that configure a processor to perform one more operations), a service, or any other software such as a private call blocking service 152 to enable management, control, and/or use of the private call blocking service 152 and/or to interface with other entities to manage (or effect management of) the private call blocking service 152. In the illustrated embodiment, the private call management application 114 can be used to interact with and/or control the private call blocking service 152, though this may not necessarily be the case in all embodiments. The private call blocking service 152 can be a callable service executed and/or hosted by a computing system, such as the call handling system 150. The call handling system 150 will be described in more detail below.

The private call management application 114 and the private call blocking service 152 can be configured to exchange various types of information with one another so as to provide, use, and/or control the private call blocking service 152 that can provide selective communication blocking in accordance with the concepts and technologies described herein. According to various embodiments, the private call management application 114 can be configured to create, collect, and/or transmit one or more instances of private call management data 116 to the private call blocking service 152. In some embodiments, the private call management data 116 can include one or more instances of caller ID data, custom private ID data, called ID data, customer account data, other information, combinations thereof, or the like. According to various embodiments of the concepts and technologies described herein, a user or other entity can interact with the private call management application 114 and/or the private call blocking service 152 to create the private call management data 116 and/or the components thereof, each of which is described in more detail below. Thus, it can be appreciated that a customer or other user can use a device (e.g., the user device 110, the calling device 120, or other computing system) to interact with the private call blocking service 152 via a web portal, a web application, a standalone application, and/or other executable software provided by the private call management application 114 to create the private call management data 116.

In some embodiments, the private call management data 116 can include customer account data that identifies a customer and/or network account that is associated with a user who accesses, subscribes, and/or otherwise uses to the private call blocking service 152, such as but not limited to a called party 161 that corresponds to the called device 160 and/or a calling party 121 that corresponds to the calling device 120. The customer may have a customer account or profile with a communications service provider associated with the network 102, an application provider via a cloud app store, or other party that can provide communication, application, and/or processing services. In some embodiments, the private call management application 114 can allow a user to sign-up for the private call blocking service 152, provide inputs to configure the private call blocking service 152, check records regarding the effectiveness of the private call blocking service 152, or otherwise interact with the private call blocking service 152. In some embodiments, the private call management application 114 can execute on a called device (e.g., the called device 160) to present one or more embodiments discussed with respect to FIGS. 2B-2D. It should be understood that the examples provided are for illustration purposes only, and therefore should not be construed as limiting in any way.

In some embodiments, the private call management data 116 can include caller ID data (e.g., the caller ID data 124), called ID data (e.g., the called ID data 162), and custom private ID data (e.g., the custom private ID data 140). A detailed discussion for each of caller ID data, called ID data, and custom private ID data is provided below. For purposes of the private call management data 116, the private call management application 114 can allow a user to provide associations between caller ID data and called ID data, where these associations between instances of caller ID data and instances of called ID data can be stored as custom private ID data and used to update and configure an association map used by the private call blocking service 152, such as a private call blocking map 132. For example, a user can indicate that when calling party "A" sends a private call to called party "B," then the private call blocking service 152 should be triggered and/or invoked to perform in a default manner and/or customized or predefined manner. In some embodiments, the user may indicate specifically when specific actions should be applied by the private call blocking service 152, and/or the order in which the actions should be applied.

For example, in one embodiment, if a calling party is a doctor and the called party is a patient, the doctor may need to call the patient after hours from the doctor's personal phone. The doctor may not want to expose the caller ID data corresponding to the calling device being used to place the call because too much information may be revealed, such as a personal telephone number, home address, and the like. In this example, the doctor may provide an instance of the private call management data 116 that indicates when a private call is made from the doctor's calling device to any one of the doctor's patients, then the private call blocking service 152 should be invoked. In some instances, the doctor may provide a distinguishing label (e.g., through an instance of customized dynamic alphanumeric string of a custom private caller ID mask discussed below), such as "Dr. Smith," that should be used to distinguish the private call as corresponding to the doctor without providing the patient's called device with the caller ID data from the doctor's calling device. In other instances, the doctor may not provide a distinguishing label but rather allow the private call blocking service 152 to assign one (e.g., "Private 00N" as discussed below with respect to FIG. 2D). Thus, in some embodiments, the private call management data 116 can allow the calling party and/or calling device to give authorization to the private call blocking service 152 to define an initial or default action that can be performed by the private call blocking service 152 in order to provide a distinguishing identity of a private call from the calling party/calling device to the called device and/or called party without providing some or all of the caller ID data corresponding to the called device. It should be understood that the examples provided are for illustration purposes only, and therefore should not be construed as limiting in any way.

By way of another example, the calling party may be a nefarious organization who uses a calling device to make private calls in order to prey on susceptibilities of called parties. In this example, the called party may use the private call management application 114 to sign-up for the private call blocking service 152 and provide an instance of the private call management data 116 that instructs the private call blocking service 152 to trigger a private call action. For example, the private call management data 116 can indicate that for any call that is a private call incoming to the called device (i.e., where caller ID data is and/or is requested to be blocked, such as through the presence of a caller ID blocking marker), then the private call blocking service 152 should be invoked and a unique label should be applied to the private call, such as an instance of a custom private caller ID mask discussed in further detail below. In some instances, the custom private caller ID mask that is used can be unique and distinct to the calling device 120 and/or calling party 121 associated with the caller ID data 124 (and the called device 160 associated with the called ID data 162) for the private call. The custom private caller ID mask can initially have a default unique label, such as discussed with respect to an instance of a dynamic alphanumeric string of a custom private caller ID mask shown in FIGS. 2B-2D. It should be understood that the examples provided are for illustration purposes only, and therefore should not be construed as limiting in any way.

In some embodiments, the private call management data 116 can include other information. The other information can include other types of data that may be considered when the private call blocking service 152 is making decisions and determinations. Instances of other information can take the form of character strings, one or more rules, options, settings, or preferences for selectively blocking a private call, such as a private call 122. For example, other information can include time and/or date parameters for which the private call blocking service 152 should be utilized, alert parameters (e.g., use of text messages, audio, video, e-mail, etc.), identifiers of which caller ID data and/or called ID data should invoke the use of the private call blocking service 152, or other preferences. In some embodiments, the other information can include identifiers corresponding with information related to a party, but which might not typically be present in caller ID data and/or called ID data, such as information about other parties associated with the calling party 121, calling device 120, called party 161, called device 160 (e.g., phone numbers, property addresses, email addresses, network addresses, or other information about known contacts, such as from an address book), organization information (e.g., identification of my boss, my assistant, etc.), family information (e.g., names and contact information for my son, my daughter, my wife, etc.), combinations thereof, or the like. It should be understood that the examples provided are for illustration purposes only, and therefore should not be construed as limiting in any way.

As shown in FIG. 1, the operating environment 100 can include the calling device 120 that can be associated with and can correspond to a user that uses the calling device 120, who is referred to as a calling party (e.g., the calling party 121). Similarly, the operating environment 100 can include the called device 160 that can be associated with and can correspond to a user that uses the called device 160, who is referred to as a called party (e.g., the called party 161). The calling device 120 and/or the called device 160 can be embodied in various forms, such as but not limited to, a smart phone, a tablet, a computing system, a smart television, a smart wearable device, or any other communication device. The operating environment 100 also can include the communication device 180 and the communication device 190. It should be understood that the examples provided are for illustration purposes only, and therefore should not be construed as limiting in any way. A discussion of an embodiment of an instance of the calling device 120, the called device 160, the communication device 180, and the communication device 190 is provided below with respect to a communication device 700 shown in FIG. 7. For clarity purposes only, the discussion of the operating environment will refer to an embodiment in which the calling device 120, the called device 160, the communication device 180, and the communication device 190 are configured as an instance of a smartphone. It should be understood that the examples provided are for illustration purposes only, and therefore should not be construed as limiting in any way.

In various embodiments, the calling device 120 can correspond or otherwise be associated with an instance of caller ID data, such as the caller ID data 124. The caller ID data 124 can correspond and be associated with the calling party 121. In some embodiments, the caller ID data 124 can be provided to the called device 160 in order to identify the calling device 120 and/or the calling party 121. However, if the caller ID data 124 is provided to, and received by, the called device 160, then the caller ID data 124 can be used by the called device 160 to place a return call to the calling device 120. For example, the caller ID data 124 can include information about the calling device 120 and/or calling party 121, such as one or more instances of a telephone number, a source network address (e.g., an IP address), an electronic mail address, a video and/or still image or visual representation, a physical address (e.g., a mailing address), a string corresponding to a moniker (e.g., a first name, last name, business title, role, etc.), a device serial number, a device model number, or other information that allows the called device 160 to call back, place, or otherwise establish a return call. By this, if the caller ID data 124 is provided to the called device 160, then the caller ID data 124 would enable the called device 160 to extract destination address information (e.g., a phone number, email, IP address, etc. corresponding to the calling device 120) from the caller ID data 124 to place a return call to the calling device 120.

Because the caller ID data 124 may identify the calling device 120 and/or the calling party 121 and/or enable the called device 160 to send a return call to the calling device 120, in some embodiments the calling device 120 may request and/or indicate that a call be handled as a private call. A private call can include any call that seeks to and/or provides a communication message and/or session to a called device with an indication and/or instruction that the caller ID data (e.g., the caller ID data 124) associated with the private call be blocked, prevented from being sent, or otherwise not provided to the called device (e.g., the called device 160) so as to prevent the called device from presenting some or all the caller ID data (e.g., name, phone number, email, etc.) to the called party and/or to prevent the called device from placing and/or engaging in a return call (e.g., from the called device 160 to the calling device 120) based on the caller ID data associated with the private call. It is understood that a "call," such as the call 122, can include an audio call, a video call, an audio voicemail message, a visual voicemail message, and/or other live or recorded communications with data sessions that provide speech, sound, and/or video messages from the calling device 120 to the called party 161 via the called device 160. In some embodiments, the call 122 can be and/or indicate an instruction to be handled as a private call when a request and/or indication is included with the call 122, such as a caller ID blocking marker 126 discussed further below, so as to serve as an instruction that the caller ID data 124 should be prevented from being sent to, and received by, the called device 160. Therefore, without the caller ID data 124 associated with the call 122 being received by the called device 160, the called device 160 will not be able to place a return call to the calling device 120 based on the call 122 being provided to the called device 160.

In various embodiments, the call 122 can be associated and correspond with and/or include the caller ID data 124, a caller ID blocking marker, such as the caller ID blocking marker 126, and called ID data, such as the called ID data 162, associated with the called device 160. The caller ID blocking marker 126 can include a flag, indicator, command, or any other instruction that represents a caller ID blocking request and informs a network entity (e.g., any device within the network 102) and/or the call handling system 150 that the call 122 should be handled as a private call, and as such, the caller ID data 124 should not be provided to the called device 160. It is understood that the caller ID blocking marker 126 is an embodiment used for example purposes only to convey that the calling device 120 and/or the calling party 121 seeks to block the caller ID data 124 from reaching the called device 160. Therefore, the examples provided are for illustration purposes only, and should not be construed as limiting in any way.

In various embodiments, the called ID data 162 corresponds with the called device 160 and/or the called party 161 to which the call 122 is directed. The called ID data 162 can include information that is configured in a format substantially similar to the caller ID data 124, with the distinction of the called ID data 162 pertaining to the called device 160 and/or the called party 161. For example, the called ID data 162 can include a phone number, name, e-mail address, or other information corresponding to the called device 160 and/or the called party 161 so that the call 122 can be provided to the called device 160 so that the calling device 120 and the called device 160 can communicate. In the operating environment 100 shown in FIG. 1, the called ID data 162 corresponds with the called device 160 and the called party 161 because the call 122 is illustrated as being between the calling device 120 and the called device 160. It is understood that, in some embodiments, the communication device 180 and the communication device 190 may also be participants of a call and thus may be considered to be a "called device" and/or a "calling device" in various embodiments. For example, the communication device 180 can include communication ID data 182 corresponding to and associated with the communication device 180, and the communication device 190 can include communication ID data 192 corresponding to and associated with the communication device 190. By this, in some embodiments, an instance of a call may include one or more of the communication ID data 182 and/or the communication ID data 192 if a call should include the communication device 180 and/or the communication device 190, respectively. It should be understood that the examples provided are for illustration purposes only, and therefore should not be construed as limiting in any way.

The operating environment 100 can include the network 102 that can communicatively couple one or more computing systems and/or communication devices, such as but not limited to, the user device 110, the calling device 120, the called device 160, the communication device 180, and the communication device 190. In various embodiments, the network 102 can include one or more of a radio access network, an evolved packet core network, a core network, an IP-based network, a transport network, an optical transport network, a circuit switched network, such as publicly switched telephone network ("PSTN"), a cellular network, a mobile Wide Area Network, a combination thereof, or the like. In some embodiments, the operating environment 100 can include the access point 108 that can provide communicative coupling between one or more devices, such as the called device 160, the call handling system 150, and the network 102. The access point 108 can provide wired and/or wireless communicative coupling and can include, but should not be limited to, one or more of a base transceiver station, a wireless router, a femtocell, an eNode B, a NodeB, a gNodeB (i.e., an access point that incorporates New Radio access technology, such as LTE Advanced and other 5G technology), a multi-standard metro cell node, a customer premise edge node (e.g., an optical network terminal), and/or other network nodes or combinations thereof that are capable of providing communication to and/or from the network 102. It should be understood that the examples provided are for illustration purposes only, and therefore should not be construed as limiting in any way.

In the embodiment illustrated in FIG. 1, the operating environment 100 can include the IMS 104 that can be included in, and/or communicatively coupled to, the network 102. The IMS 104 can include the PCSCF 106. The calling party 121 can direct the calling device 120 to place the call 122 that is intended for the called device 160. According to various embodiments, the call 122 or other communications initiated or otherwise placed by the calling device 120 can occur and/or be controlled and supported via the IMS 104 for transmission and/or routing within and/or across the network 102 to another device (e.g., the called device 160). According to various embodiments of the concepts and technologies described herein, the PCSCF 106 can route communications (e.g., the call 122, a call handling command 157, other calls (e.g., future calls 129 from the calling device 120), and/or a call data record from, among, and/or between devices (e.g., the calling device 120, the call handling system 150, the called device 160, the access point 108, or other devices within the operating environment 100) in accordance with various rules and/or in accordance with the private call blocking service 152. Because the IMS 104 is generally understood, the IMS 104 will not be further described herein.

In various embodiments, the operating environment 100 can include the call handling system 150 that can execute, host, or otherwise support the private call blocking service 152 via one or more instances of a processing unit, such as a processor 154. In embodiments, the call handling system 150 can include a non-generic computer system that can be configured by execution of the private call blocking service 152. The call handling system 150 can include a data storage device, such as a memory 156. The memory 156 can store at least a portion of the private call blocking service 152 and/or other information, such as a fixed label 153. In some embodiments, the memory 156 can provide the communication network data store 130, which is further discussed below. In some embodiments, the memory 156 can include volatile and/or non-volatile memory implemented in any method or technology for storage of information such as computer-readable instructions, data structures, program modules, or other data disclosed herein. The memory 156 can be referred to as a "computer storage medium." It is understood that, use of the terms "memory" and "computer storage medium" (and variations thereof, such as computer-readable storage medium) in the claims do not include, and shall not be construed to include, a wave or a signal per se and/or communication media.

The call handling system 150 can be in communication with one or more devices, such as but not limited to, the network 102, the communication network data store 130, the access point 108, the calling device 120, the user device 110, the called device 160, the communication device 180, the communication device 190, or any other computing system. In some embodiments, the call handling system 150 may be configured as a physical computing system (e.g., a server that supports a back-end cloud network, a removable dongle, an access point, a user equipment, etc.) and/or a virtual computing system (e.g., a virtual server or other virtual machine that is hosted by one or more computing systems). In some embodiments, the call handling system 150 can be communicatively located downstream of the network 102 and upstream of one or more devices involved in a call, such as the access point 108 and the called device 160 involved in the call 122. The call handling system 150 can be configured according to an embodiment of a computer system discussed with respect to FIG. 6. It should be understood that the examples provided are for illustration purposes only, and therefore should not be construed as limiting in any way.

In various embodiments, the private call blocking service 152 can be supported by and configure the call handling system 150 to perform one or more operations in handling the call 122. It is understood that the use of the term "service" is intended to correspond with one or more network operations that support handling of network communications (e.g., the call 122). Therefore, any use of the term "service" in the claims shall not be construed or interpreted as being directed to, involving, or otherwise including a judicial exception (e.g., an abstract idea) or any other non-patentable subject matter. In various embodiments, the private call blocking service 152 can include one or more of an application, a program, a software module (i.e., a defined set of callable computing instructions that configure a processor to perform one more operations), a script, a routine or any other computer-executable instructions that configure a processor (e.g., the processor 154) to perform one or more operations and/or recitations discussed herein.

In an embodiment, a user may not have signed-up for the private call blocking service 152 or otherwise not authorized the use of the private call blocking service 152 for incoming calls that are marked as a private call. For example, in this embodiment, the call 122 may be placed by the calling device 120 and intended for the called device 160. The call handling system 150 may detect that the call 122 is being sent or otherwise directed to the called device 160 and that the call 122 includes, has, or otherwise is associated with an indicator that the call 122 should be a private call, such as via the caller ID blocking marker 126. In this embodiment, the call handling system 150 can analyze the called ID data 162 and determine that the called device 160 has not authorized the use of the private call blocking service 152. In response to this determination, the call handling system 150 may determine that the caller ID data 124 should be blocked and not sent to the called device 160 based on the call 122 being a private call due to the presence of the caller ID blocking marker 126. When the private call blocking service 152 is not invoked or activated, the call handling system 150 can prevent the caller ID data 124 from being sent to the called device 160 with the call 122. The call handling system 150 can replace the caller ID data 124 with a fixed label, such as the fixed label 153, that can be retrieved from the memory 156. The fixed label 153 may be used for every instance of a private call that does not engage in the use of the private call blocking service 152. As such, the fixed label 153 is not unique to the call and the called device for which it is applied, such as the call 122 and the called device 160. The fixed label 153 can include a static alphanumeric string 153A. Examples of the static alphanumeric string 153A can include one or more of "private," "anonymous," "unknown," "unknown caller," "caller ID blocked," "wireless caller," "unavailable," or any other generally applied string that applies irrespective of the caller ID data 124 and the called ID data 162, and therefore is not unique to one or more of the called device 160, the call 122, the calling device 120, the calling party 121, or the called party 161. It should be understood that the examples provided are for illustration purposes only, and therefore should not be construed as limiting in any way. In this embodiment where the private call blocking service 152 is not invoked, the call 122 can be provided to the called device 160 without the caller ID data 124, but with the fixed label 153 that can be configured with the static alphanumeric string 153A. The fixed label 153 can instruct the called device 160 to present the static alphanumeric string 153A to the called party 161 on a display 164 of the called device 160 to the called party 161, such as in an embodiment discussed below with respect to FIG. 2A. It should be understood that the examples provided are for illustration purposes only, and therefore should not be construed as limiting in any way.

In other embodiments of the present disclosure, the private call blocking service 152 may be invoked or otherwise authorized for use automatically. The private call blocking service 152 can be invoked or otherwise applied to any call irrespective of whether the calling party 121, the calling device 120, the called party 161, the called device 160, or any other device or party is aware of the private call blocking service 152. At some point in time, the private call blocking service 152 can detect the call 122 from the calling device 120 directed to the called device 160. For example, in some embodiments, the private call blocking service 152 can determine that the call 122 is being sent to and/or received from a device operating on the network 102 (e.g., a call routing server), a device operating on the IMS 104 (e.g., the PCSCF 106), the called device 160, the calling device 120, combinations thereof, or the like. In some embodiments, this is accomplished by the private call blocking service 152 being executed on the call handling system 150, which can be an intermediary between the called device 160 and the network 102, thereby causing the private call blocking service 152 to handle, reconfigure, or otherwise act on the call 122 (e.g., by receiving the call 122 from the network 102) before the call 122 reaches the called device 160.

The private call blocking service 152 can analyze the call 122 to determine whether the call 122 corresponds or otherwise indicates that it should be treated as a private call. For example, the private call blocking service 152 can determine whether the caller ID data 124 should be blocked or otherwise be prevented from being sent to the called device 160 with the call 122. In some embodiments, the private call blocking service 152 can determine this based on the presence of the caller ID blocking marker 126 that is provided, invoked, included, or otherwise indicated by the call 122. In some embodiments, the private call blocking service 152 can determine that the call 122 has the caller ID blocking marker 126, and therefore the private call blocking service 152 is instructed to prevent the called device 160 from receiving and/or presenting the caller ID data 124 associated with the calling device 120, which in turn prevents the called device 160 from being able to place, attempt, or otherwise engage in a return call based on the caller ID data 124 itself being sent to the called device 160. In some embodiments, the caller ID blocking marker 126 may be used to indicate and/or instruct the call handling system 150 to provide the fixed label 153 to the called device 160. However, the private call blocking service 152 may block or prevent the fixed label 153 from being provided to the called device 160 for the call 122, and instead authorize the use of a custom private caller identification mask ("custom private caller ID mask"), which are discussed below with respect to the communication network data store 130.

In various embodiments, the private call blocking service 152 can access and utilize the communication network data store 130. As used herein, the phrase "data store" refers to a data storage device such as a database, a data server, a mass data storage device, or other memory or computer readable medium. In the embodiment shown in FIG. 1, the functionality of a data store (e.g., the communication network data store 130) can be provided by one or more databases, data storage device, server computers, desktop computers, mobile telephones, laptop computers, other computing systems, and the like. It should be understood that this example is illustrative and therefore should not be construed as being limiting in any way. The communication network data store 130 can include a call ID data pool 134 that corresponds with information pertaining to the handling of private calls by the private call blocking service 152. For example, the communications network data store 130 can include one or more instances of caller ID data (e.g., the caller ID data 124), one or more instances of called ID data (e.g., the called ID data 162), the private call blocking map 132, one or more instances of private call block instructions (e.g., a selective private call block instruction 136, a universal private call block instruction 137, and a universal private call block override instruction 138), and one or more instances of custom private ID data (e.g., the custom private ID data 140). In some embodiments, an instance of the custom private ID data 140 can correspond with a calling device (e.g., the calling device 120) and/or a called device (e.g., the called device 160) so as to facilitate the use of the private call blocking service 152. For example, the custom private ID data 140 can include and/or be associated with one or more instances of a custom private caller identification mask ("custom private caller ID mask") (e.g., a custom private caller ID mask A 142A, a custom private caller ID mask B 142B, and a custom private caller ID mask N 142N), where each instance of a custom private caller ID mask (e.g., the custom private caller ID mask A 142A) can be uniquely generated for, and provided to, the called device (e.g., the called device 160) based on the particular caller ID data (e.g., the caller ID data 124), the calling device (e.g., the calling device 120), the called ID data (e.g., the called ID data 162), and/or the called device (e.g., the called device 160) associated with the private call directed to the called device (e.g., the call 122 having the caller ID blocking marker 126 that is being sent to the called device 160).

In various embodiments, the private call blocking map 132 can provide data mapping and pointers to the custom private ID data 140 so as to identify associations between one or more of the caller ID data 124, the called ID data 162, and the custom private ID data 140 (e.g., one or more instance of a custom private caller ID mask discussed below). For example, the private call blocking service 152 can access the private call blocking map 132 and use the called ID data 162 and/or the caller ID data 124 to determine whether a custom private caller ID mask has been created for presentation on the called device 160 when a call (e.g., the call 122) from the calling device 120 directed to the called device 160 is detected. In some embodiments, the private call blocking service 152 can determine that the call 122 is from the calling device 120 based on the caller ID data 124, and that the call 122 is directed to the called device 160 based on the called ID data 162. Based on these determinations, the private call blocking service 152 can use the private call blocking map 132 to identify which instance of a custom private data mask should be used. For example, the private call blocking service 152 can determine that based on (or because) the call 122 is sent from the calling device 120 with the caller ID data 124 and is directed towards the called device 160 associated with the called ID data 162, then the private call blocking map 132 indicates that the custom private caller ID mask A 142A should be used to block the caller ID data 124 and be provided, instead of the caller ID data 124, along with the call 122 to the called device 160.

In various embodiments, each instance of a custom private caller identification mask (e.g., the custom private caller ID masks 142A-142N) may be unique for, and distinctly provided to, a specific called device. In some embodiments, a separate instance of the custom private ID data 140 may correspond to one called device, such as one unique instance of the custom private ID data 140 that is specifically configured for each of the called device 160, the communication device 180, and the communication device 190. By way of example, in an embodiment, the called device 160 can be the recipient and intended target destination of the call 122. The custom private ID data 140 illustrated in FIG. 1 may have a plurality of custom private caller ID masks (e.g., the custom private caller ID masks 142A-142N) that are reserved for the called device 160 and are distinct and unique from each other because each custom private caller ID mask is only used and provided to the called device 160 when a private call is from a certain calling device. Therefore, in an embodiment, if there are three instances of a custom private caller ID mask, then each of the three instances of the custom private caller ID masks are reserved for the called device, but only one instance of the custom private caller ID mask from the three instances is provided to the called device 160 based on the calling device and caller ID data that is determined to correspond with the incoming private call. For example, as shown in FIG. 1, the call 122 may have been placed by the calling device 120 and therefore the caller ID data 124 corresponds with the calling device 120. The private call blocking service 152 can use the private call blocking map 132 to determine that when the call 122 is from the calling device 120 and directed to the called device 160 (based on the caller ID data 124 and the called ID data 162 associated with the call 122), then the custom private caller ID mask A 142A should be used and provided to the called device 160 instead of the fixed label 153. However, if the private call blocking service 152 detects another private call determined to be from the communication device 180 and directed to the called device 160 (based on the other private call being associated with the communication ID data 182 of the communication device 180 and the called ID data 162 of the called device 160), then the custom private caller ID mask B 142B should be used and provided to the called device 160 instead of the fixed label 153. Similarly, if yet another private call is made and is determined to be from the communication device 190 and directed to the called device 160 (based on the other private call being associated with communication ID data 192 of the communication device 190 and the called ID data 162 of the called device 160), then the custom private caller ID mask N 142N should be used and provided to the called device 160 instead of the fixed label 153. By this, each instance of a custom private caller ID mask (e.g., the custom private caller ID masks 142A-142N) may be uniquely generated, customized, and/or implemented for private calls to the called device 160 so as to enable the called device 160 to distinguish between private calls, to enable selective private call blocking such that a private call from one calling party can be blocked without necessarily blocking all incoming private calls, and to abide by the request of the calling device 120 and/or calling party 121 not to provide the caller ID data 124 to the called device 160 (as indicated by the presence of the caller ID blocking marker 126). An example of how each instance of a custom private caller ID mask can be presented with distinct visual user interfaces is shown and will be discussed with respect to FIGS. 2B-2D. It is understood that use of the term "N" refers to an arbitrary number of instances that may vary depending on how many instances of that component are in existence. As such, although a certain number of instances may be illustrated, it is understood that number shown is for illustration purposes only and therefore should not be construed as limiting in any way.

In various embodiments, each instance of caller ID data (e.g., the caller ID data 124) can correspond with a plurality of private caller ID masks, where each private caller ID mask of the plurality of private caller ID masks is associated with a different, particular called device. As such, when the same calling device places private calls to different called devices, each of the different called devices will receive, from the private call blocking service 152, a different custom private caller ID mask that is unique to that called device for the private call that is received, and therefore each instance of a custom private caller ID mask may be configured differently based on the association between the caller ID data and the particular called ID data for the particular called device.

In various embodiments, each instance of a custom private caller ID mask (e.g., the custom private caller ID masks 142A-142N) can have a dynamic alphanumeric string 143 that can be configured based on the caller ID data of the calling device and the called ID data of the called device. For example, in an embodiment, the custom private caller ID mask A 142A can include the dynamic alphanumeric string 143 that can be provided to the called device 160 for the call 122. The dynamic alphanumeric string 143 of the custom private caller ID mask A 142A can be provided to the called device 160 for the call 122 (that is determined to be a private call), replacing the static alphanumeric string 153A of the fixed label 153 that (if the private call blocking service 152 was not in use) may have previously been provided along with the call 122 instead of the caller ID data 124. Therefore, instead of the called device 160 being instructed to present the static alphanumeric string 153A for every private call irrespective of the caller ID data 124 corresponding to the calling device 120 for the call 122, the private call blocking service 152 can provide the custom private caller ID mask A 142A to the called device 160 for the call 122 and instruct the called device 160 to present the dynamic alphanumeric string 143. Embodiments of the dynamic alphanumeric string 143 are shown and discussed with respect to FIGS. 2B-2D. In various embodiments, the dynamic alphanumeric string 143 can be configured to conform to a defined maximum number of characters (e.g., letters, numbers, symbols, etc.), such as a maximum of fifteen characters. However, this may not be the case in every embodiment. In some embodiments, the dynamic alphanumeric string 143 may be customizable and/or (re)configured based on input from one or more users, such as input from the called party 161, as discussed below with respect to an instance of a mask alteration instruction. It should be understood that the examples provided are for illustration purposes only, and therefore should not be construed as limiting in any way. Further discussion of embodiments of a custom private caller ID mask and a dynamic alphanumeric string 143 is provided below with respect to FIGS. 2B-2D.

In an embodiment, information from an instance of a custom private caller ID mask (e.g., the custom private caller ID mask A 142A) can be applied and/or saved to one or more data fields that are included in an address book of the called device (e.g., the called device 160). For example, the custom private caller ID mask A 142A can include instructions that direct the called device 160 to store the dynamic alphanumeric string 143 in a data field of an address book of the called device 160. The address book may also be referred to as a contact list. The dynamic alphanumeric string 143 does not contain a telephone number or other information that supports and/or facilitates placing and/or engaging in an outgoing call back from the called device 160 to the calling device 120. As such, any and/or all data fields of an address book of the called device 160 may be populated by information provided by the custom private caller ID mask A 142A, as long as the data field does not permit an outgoing and/or return call to the private caller (e.g., the calling party 121 corresponding to the calling device 120).

In various embodiments, the private call blocking service 152 can provide the custom private caller ID mask A 142A and the call 122 to the called device 160 without providing or otherwise sending the caller ID data 124 associated with the calling device 120. By this, the custom private caller ID mask A 142A does not allow the called device 160 to establish, engage, or otherwise place a return call to the calling device 120 based on the custom private caller ID mask A 142A. The instance of the custom private caller ID mask being sent (e.g., the custom private caller ID mask A 142A) can instruct the called device 160 to present the dynamic alphanumeric string 143 to the called party 161 via the display 164 of the called device 160. In some embodiments, the custom private caller ID mask (e.g., the custom private caller ID mask A 142A) does not reveal some and/or any of the caller ID data (e.g., the caller ID data 124) that was initially sent or associated with the call 122. In some embodiments, the dynamic alphanumeric string 143 that is presented by the called device 160 may have a default unique label for the called device 160, such as "Private 00N" shown in FIG. 2B, where "N" refers to a number uniquely assigned to the calling device 120 and/or caller ID data 124. It should be understood that the examples provided are for illustration purposes only, and therefore should not be construed as limiting in any way.

Figure 2B:
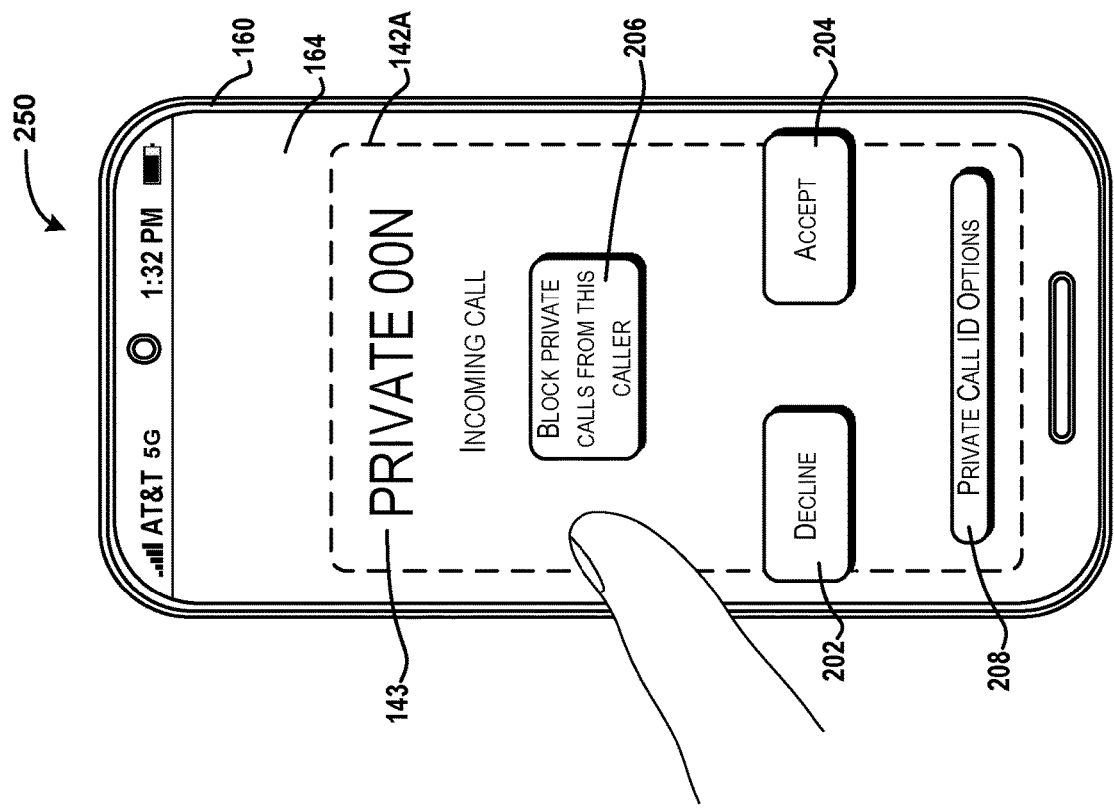
FIG. 2B is a user interface diagram showing an example screen display for providing selective call blocking with a private call blocking service, according to an illustrative embodiment of the concepts and technologies described herein.
Figure 2A:
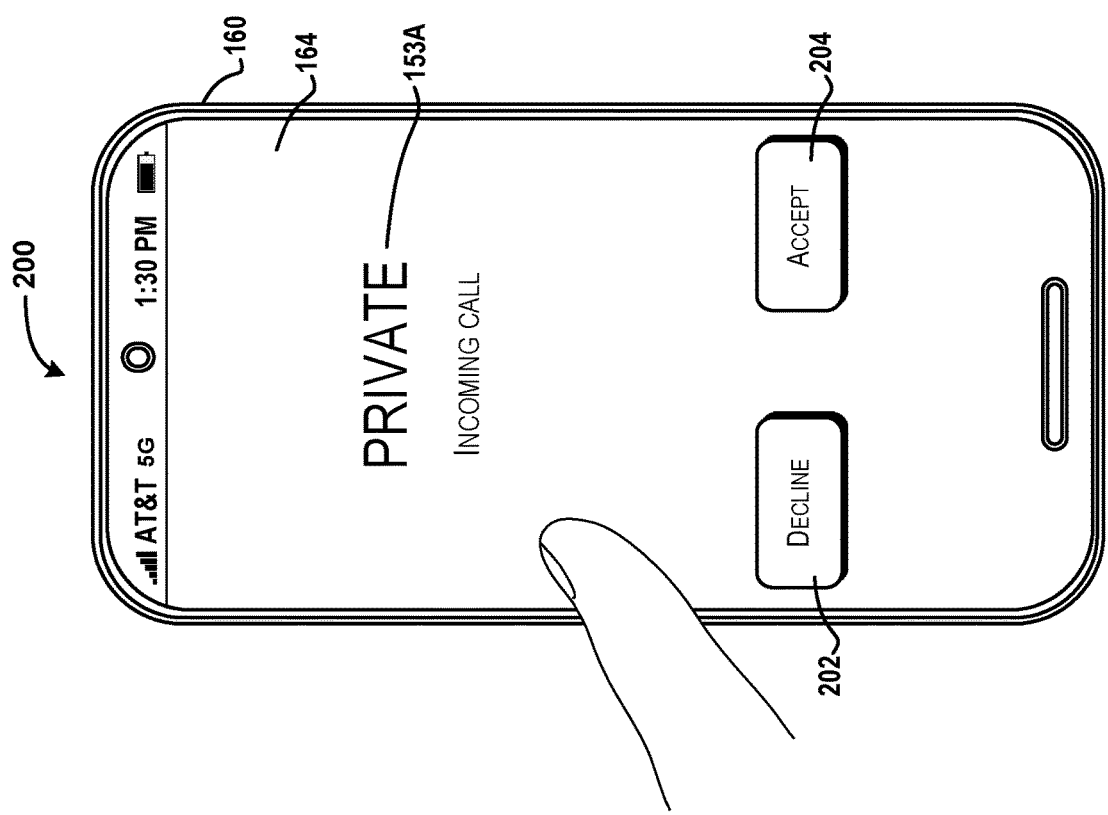
FIG. 2A is a user interface diagram showing an example screen display for a private call without implementation of a private call blocking service, according to an illustrative embodiment of the concepts and technologies described herein.
Figure 2D:
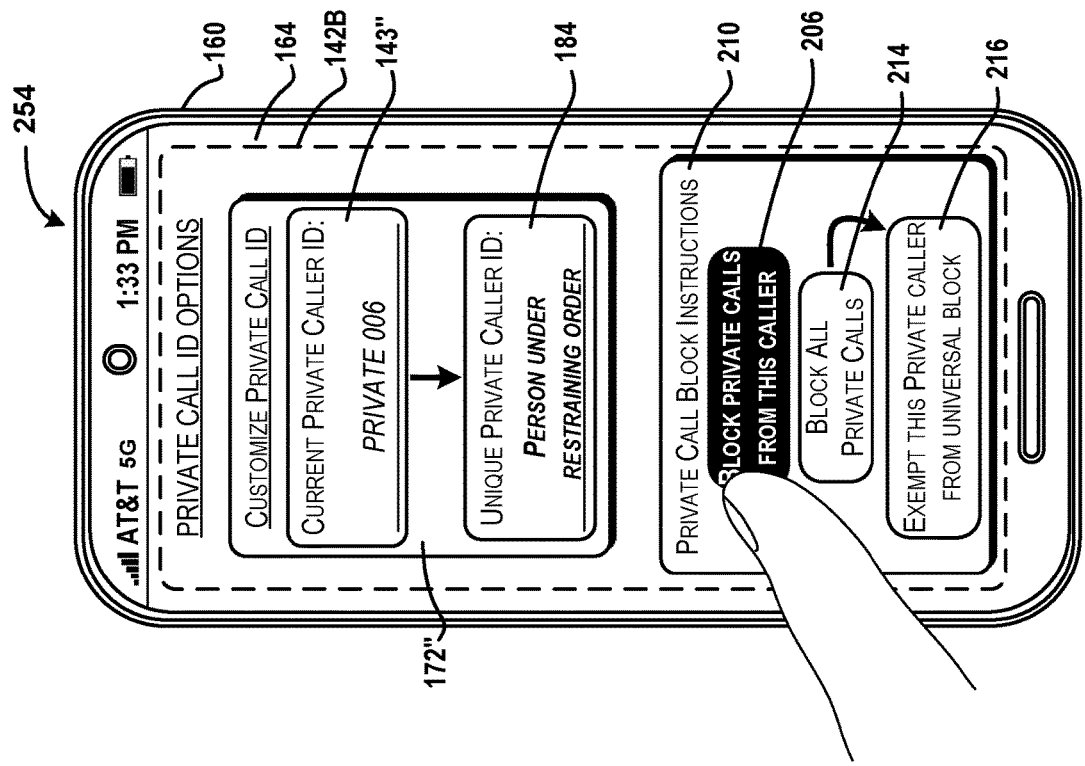
FIG. 2D is a user interface diagram showing another example screen display for reconfiguring selective call blocking with a private call blocking service, according to an illustrative embodiment of the concepts and technologies described herein.
Figure 2C:
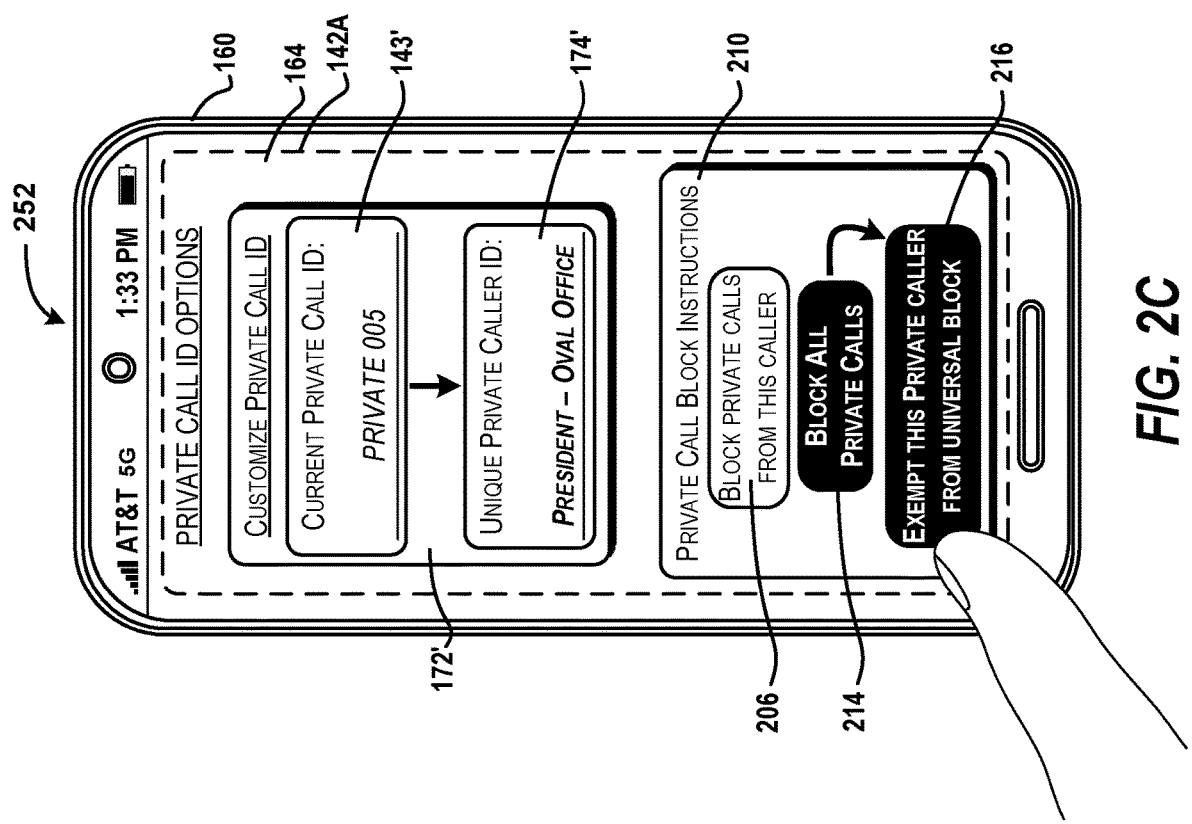
FIG. 2C is a user interface diagram showing an example screen display for reconfiguring selective call blocking with a private call blocking service, according to an illustrative embodiment of the concepts and technologies described herein.

In some embodiments, when the called device 160 receives the call 122 and the custom private caller ID mask (e.g., the custom private caller ID mask A 142A), the custom private caller ID mask A 142A can present one or more buttons and/or options on the display 164, such as shown in FIGS. 2B-2D. The custom private caller ID mask (e.g., the custom private caller ID mask A 142A) can enable the called party 161 to provide input as to whether a private call (e.g., the call 122) should be accepted, denied, blocked, or another user-defined action. In some embodiments, the called party 161 can provide input that corresponds with a selective private call block instruction, such as the selective private call block instruction 136. For example, the called party 161 can provide input to the display 164 of the called device 160 that causes the called device 160 to generate an instance of the selective private call block instruction 136. In some embodiments, the button and/or option for generating the selective private call block instruction 136 can be provided by an instance of the private call management application 114 that may be executing in the foreground or background of the called device 160. Therefore, when the called party 161 wants to selectively block incoming private calls (e.g., the call 122) that correspond with a custom private caller ID mask (e.g., the custom private caller ID mask A 142A) (and therefore also correspond and are associated with the caller ID data 124 despite the caller ID data 124 not being provided with the call 122), then the selective private call block instruction 136 can be provided to the private call blocking service 152. When the private call blocking service 152 receives the selective private call block instruction 136 that is based on the custom private caller ID mask (e.g., the custom private caller ID mask A 142A) and/or the private call (e.g., the call 122), then the private call blocking service 152 can associate the custom private caller ID mask A 142A with the caller ID data 124 and block or otherwise prevent future calls that are private calls and correspond with the caller ID data 124 and/or are otherwise incoming from the calling device 120. It is understood that the phrase "future call(s)" and/or "subsequent call(s)" refers to an incoming call that is sent or otherwise attempted to be established from the calling device 120 (or is otherwise associated with the caller ID data 124) after the private call that corresponded or otherwise instigated the selective private call block instruction 136 (e.g., the call 122). Put differently, a future call and/or subsequent call can be any incoming private call that is being sent to the called device 160 at a point later in time than the initial private call (e.g., the call 122) that caused the selective private call block instruction 136 to be sent to the private call blocking service 152. For example, if the call 122 is a private call that causes the private call blocking service 152 to provide the custom private ID mask A 142A to the called device 160, and in response to presenting the custom private caller ID mask A 142A by the called device 160 the selective private call block instruction 136 is sent to the private call blocking service 152, then at a point later in time, the calling device 120 may place a future call 129 (also referred to as a subsequent call) to the called device 160, where the future call 129 can provide an instance of the caller ID data 124 and request to be a private call (e.g., via the presence of an instance of the caller ID blocking marker 126). The private call blocking service 152 can determine that the called device 160 has provided the selective private call block instruction 136 for one or more of the caller ID data 124, calling device 120, and/or the custom private caller ID mask A 142A, and in response, can prevent the future call 129 from being provided to the called device 160 based on the selective private call block instruction 136. Further discussion of the selective private call block instruction 136 is provided below with respect to FIGS. 2B-2D.

In some embodiments, the called party 161 can provide input to the called device 160 based on the custom private caller ID mask corresponding with a private call (e.g., the custom private caller ID mask A 142A corresponding with the call 122). For example, the input may prompt or cause the called device 160 to send a universal private call block instruction, such as the universal private call block instruction 137, and/or a universal private call block override instruction, such as the universal private call block override instruction 138, to the private call blocking service 152, where the universal private call block instruction 137 and the universal private call block override instruction 138 can be associated with and correspond to private calls that use a custom private caller ID mask (e.g., the call 122 that corresponds with the custom private caller ID mask A 142A) directed to the called device 160. In an embodiment, the universal private call block instruction 137 can instruct the private call blocking service 152 to prevent one or more or all private calls from reaching or otherwise being sent to the called device 160 unless the universal private call block override instruction 138 is provided, where the universal private call block override instruction 138 exempts a private call from being automatically blocked and prevented from reaching the called device 160. In some embodiments, an instance of the universal private call block override instruction 138 can be associated with a custom private caller ID mask, and thus also be associated with an instance of caller ID data (e.g., the custom private caller ID mask A 142A that is associated with the caller ID data 124). An instance of the universal private call block instruction 137 can instruct the private call blocking service 152 that private calls are not to be provided to the called device 160 unless the universal private call block override instruction 138 is provided, where the universal private call block override instruction 138 can indicate authorization to allow one or more custom private caller ID mask (e.g., the custom private caller ID mask A 142A) to be used for the corresponding private call. As such, in an embodiment, when a universal private call block instruction 137 is provided by the called device 160 or otherwise associated with the called ID data 162, then private calls may be prevented from reaching the called device 160 unless the called device 160 also provides the universal private call block override instruction 138 that identifies one or more custom private caller ID mask that are allowed to be provided to the called device 160. Further discussion of the universal private call block instruction 137 and the universal private call block override instruction 138 are discussed below with respect to FIG. 2C.

In various embodiments, the private call blocking service 152 can enable the called device 160 to customize a custom private caller ID mask for a private call (e.g., the custom private caller ID mask A 142A for the call 122) to generate a unique private caller ID to be used in place of a default label assigned to the dynamic alphanumeric string 143 of the custom private caller ID mask provided for the private call. In various embodiments, each called device that utilizes the private call blocking service 152 can generate a unique private caller ID for each instance of a custom private caller ID mask that is received for different private calls. For example, when the custom private caller ID mask A 142A is initially provided to the called device 160, the dynamic alphanumeric string 143 may be initially configured with a first string of characters that is unique to the caller ID data 124, such as "private 00N" (where "N" is configured uniquely for the calling device 120) which is shown and discussed with respect to FIGS. 2B-2D. The called party 161 can provide input that generates a unique private caller ID 174 so as to customize the dynamic alphanumeric string 143 of the custom private caller ID mask A 142A corresponding to the caller ID data 124 and the calling device 120. Similarly, when the calling device 120 sends a private call to another called device, that other called device may receive a different, unique instance of a custom private caller ID mask than the custom private caller ID mask A 142A, and the other called device may provide a different unique private caller ID that corresponds to the calling device 120. As such, the different called devices may be provided with different custom private caller ID masks for private calls that are coming from the same calling device 120, and each called device can customize the unique custom private caller ID mask that they receive through a different unique private caller ID. It should be understood that the examples provided are for illustration purposes only, and therefore should not be construed as limiting in any way.

In some embodiments, the private call blocking service 152 can allow the called device 160 to generate a customization message 170 that includes a mask alteration instruction 172, where the mask alteration instruction 172 can include the unique private caller ID 174. The private call blocking service 152 can receive the customization message 170 in response to providing the custom private caller ID mask A 142A to the called device 160 for the call 122. The private call blocking service 152 can extract the mask alteration instruction 172 and (re)configure the corresponding custom private caller identification mask (e.g., the custom private mask A 142A) by modifying the dynamic alphanumeric string 143 so as to present the unique private caller ID 174 for the call 122 and for any future private calls associated with the caller ID data 124 directed to the called device 160. The private call blocking service 152 can save and store the custom private caller ID mask A 142A that has been modified and/or updated with the unique private caller ID 174 so as to be made available for use during a future call (e.g., the future call 129). As such, the next time that the future call 129 is determined to be a private call that is sent by the calling device 120 to the called device 160, and thus the custom private caller ID mask A 142A is to be used for the call 122 instead of the fixed label 153, then the custom private caller ID mask A 142A provided to the called device 160 will present the unique private caller ID 174 (that was provided by the called device 160 and/or calling party 161) via the dynamic alphanumeric string 143 for the future call 129. Further discussion of an embodiment of the unique private caller ID 174 is shown and discussed with respect to FIGS. 2B-2D.

In an embodiment, if the call 122 had been placed by the communication device 180 and/or the communication device 190 and directed to the called device 160 (instead of the calling device 120 placing the call 122), then the private call blocking service 152 may have analyzed the private call blocking map 132 and provided, to the called device 160, the custom private caller ID mask B 142B based on the communication ID data 182 (corresponding to the communication device 180) or the custom private caller ID mask N 142N based on the communication ID data 192 (corresponding to the communication device 190). In an embodiment, the called device 160 can customize the custom private caller ID mask B 142B by providing, via an instance of a customization message and a mask alteration instruction, a unique private caller ID 184 to the private call blocking service 152 so that the private call blocking service 152 can reconfigure the custom private caller ID mask B 142B based on the mask alteration instruction, and in turn cause the unique private caller ID 184 to be presented in the custom private caller ID mask B 142B during future private calls from the communication device 180 to the called device 160. Similarly, in an embodiment, the called device 160 can customize the custom private caller ID mask N 142N corresponding to the communication device 190 by providing, via an instance of a customization message and a mask alteration instruction, a unique private caller ID 194 to the private call blocking service 152 so that the private call blocking service 152 can reconfigure the custom private caller ID mask N 142N based on the mask alteration instruction, and in turn cause the unique private caller ID 194 to be presented in the custom private caller ID mask N 142N during future private calls from the communication device 190 to the called device 160. An example of an embodiment of concepts and technologies discussed herein is provided below with respect to FIGS. 2C-2D. It should be understood that the examples provided are for illustration purposes only, and therefore should not be construed as limiting in any way.

It is understood that an instance of a unique private caller ID that reconfigures and is used in place of an instance of a custom private caller ID mask (e.g., the unique private caller ID 174 associated with the custom private caller ID mask A 142A, the unique private caller ID 184 associated with the custom private caller ID mask B 142B, and/or the unique private caller ID 194 associated with the custom private caller ID mask N 142N) does not enable or otherwise allow the called device (e.g., the called device 160) to place, establish, and/or engage in a return call to the calling device (e.g., the calling device 120). It should be understood that the examples provided are for illustration purposes only, and therefore should not be construed as limiting in any way.

In various embodiments, the private call blocking service 152 can issue a call handling command, such as the call handling command 157, for a private call (e.g., the call 122) based on an instruction from the called device 160 (e.g., the selective private call block instruction 136). For example, in some embodiments, the private call blocking service 152 can receive the selective private call block instruction 136 that was generated based on the custom private caller ID mask A 142A corresponding to the private call (e.g., the call 122). The selective private call block instruction 136 can instruct the private call blocking service 152 to block or otherwise prevent a private call (e.g., the call 122) and future calls (e.g., the future call 129) associated with the caller ID data corresponding with the custom private caller ID mask (e.g., the caller ID data 124 of the calling device 120 corresponding with the custom private caller ID mask A 142A) from reaching or otherwise being sent to the called device 160. The call handling command 157 can be based on the instruction (e.g., the selective private call block instruction 136). For example, in response to determining that the selective private call block instruction 136 is associated with or otherwise pertains to a private call (e.g., the call 122 and/or the future call 129) from the calling device 120 having the caller ID data 124, then the call handling command 157 can be generated, and the call handling command 157 can instruct the network 102 to drop, block, or otherwise prevent the private call (e.g., the call 122 and/or the future call 129) from reaching or otherwise being sent to the called device 160. The call handling command 157 can be provided to the network 102 from which the call 122 was routed from, received, and/or detected by the private call blocking service 152.

According to various embodiments of the concepts and technologies described herein, the private call blocking service 152 can provide the call handling command 157 to the PCSCF 106 of the IMS 104 associated with the network 102, and the PCSCF 106 is caused to act in response to the call handling command 157 to effect a call handling action. For example, the PCSCF 106 can, based on the call handling command 157, perform a call handling action that can include, but should not be limited to, one or more of dropping the private call (e.g., by preventing or blocking the call 122 and/or the future call 129 from reaching the called device 160 and/or disconnecting the call 122 and/or the future call 129 from the network 102), informing the calling device 120 that the private call (e.g., the call 122 and/or the future call 129) cannot be completed, informing the called device 160 that the call 122 was attempted from private caller (e.g., the calling device 120 associated with the caller ID data 124), diverting the private call away from the original intended recipient (i.e., divert the call away from the called device 160) and to an (un)associated target (not shown), such as an automated response service or other system of the network 102, or another action that can be defined by the call handling system 150 and/or the called device 160 via the private call management application 114.

In some embodiments, the private call blocking service 152 can configure a custom private caller ID mask (e.g., the custom private caller ID mask A 142A) so as to instruct the called device 160 to present an option (e.g., a button among private call ID options) to generate a redirect instruction 177 to prevent or block a future private call (e.g., the future call 129) from reaching the called device 160 and divert, route, or otherwise redirect the future private call (e.g., the future call 129) to a voicemail system (which may be provided by PCSCF 106 and/or IMS 104) such that the called party 160 can screen an identity of the calling party 121 associated with the future private call (e.g., the future call 129) without the called device 160 receiving the caller ID data 124 associated with the calling device 120. It is understood that one or more buttons shown with respect to FIGS. 2B-2D (e.g., the selective universal private block button 206) can be provided by a custom private caller ID mask (e.g., the custom private caller ID mask A 142A) such that in response to user input that triggers the selective universal private block button 206, the selective universal private block button 206 causes the called device 160 to create the redirect instruction 177. In some embodiments, the redirect instruction 177 can be included in an instance of the customization message 170. In response to receiving the redirect instruction 177 based on the custom private caller ID mask A 142A provided to the called device 160, the private call blocking service 152 can generate and configure an instance of the call handling command 157 to effect a call handling action in accordance with the redirect instruction 177, such as configuring the call handling command 157 to reroute or otherwise redirect one or more (or all) future private calls (e.g., the future call 129) associated with the caller ID data 124 to a voicemail system (e.g., provided by the IMS 104) such that the called device 160 is prevented from receiving the future private calls and prevented from receiving the caller ID data 124. In some embodiments, when a call handling action is implemented by the private call blocking service 152 (e.g., while and/or in response to issuing the call handling command 157 based on the redirect instruction 177 that redirects and routes a future private call to a voicemail system), the private call blocking service 152 can provide the corresponding custom private caller ID mask (e.g., the custom private caller ID mask A 142A) to the called device 160 and the custom private caller ID mask A 142A can be configured to present the call handling action associated with the call handling command 157 on the called device 160 so as to inform the called party 161 that the call handling action was performed (e.g., configure the dynamic alphanumeric string 143 with a string of characters that presents "private call blocked and routed to voicemail"), where the custom private caller ID mask (e.g., the custom private caller ID mask A 142A) can be sent to the called device 160 without the called device 160 being provided with (i.e., without the called device 160 receiving) the future private call (e.g., the future call 122) or the caller ID data 124 associated with the calling device 120. In some embodiments, selective private call block instruction 136 can include the redirect instruction 177 such that when the private call block instruction is received by the private call blocking service 152, the redirect instruction 177 embedded in the selective private call block instruction can also be received. It should be understood that the examples provided are for illustration purposes only, and therefore should not be construed as limiting in any way.

In some embodiments, in response to the private call blocking service 152 creating the call handling command 157 based on an instruction from the called device 160 (e.g., the selective private call block instruction 136, the universal private call block instruction 137, the universal private call block override instruction 138, and/or the redirect instruction 177), the call handling command 157 can be sent to another entity, such as the PCSCF 106 that can divert, redirect, reroute, drop, block, or otherwise prevent the call 122 from reaching the called device 160 and perform a call handling action in accordance with the call handling command 157 (e.g., routing the future call 129 to a voicemail system while providing the custom private caller ID mask A 142A to the called device 160). In some embodiments the call handling command 157 can be passed to another network entity, such as a processor, a messaging platform, an administrator device, a voicemail system, a call data record server, a usage server, or the like in addition to, or instead of, being passed to the PCSCF 106. One or more network entities can perform various actions, trigger various generation of call records, and/or process the call handling command 157 according to the instructions contained therein. Thus, it can be appreciated that the other network entity can include a short message service center ("SMSC"), multimedia message service center ("MMSC"), an email server, a messaging platform, or the like, which can generate, trigger, and/or send one or more messages to various recipients in response to receiving the call handling command 157. It should be understood that the examples provided are for illustration purposes only, and therefore should not be construed as limiting in any way.

It is understood that FIG. 1 illustrates an instance of one network 102, one IMS 104, one PCSCF 106, one access point 108, one user device 110, one operating system 112, one private call management application 114, one private call management data 116, one caller ID data 124, one calling device 120, one calling party 121, one call 122, one future call 129, one communication network data store 130, one private call blocking map 132, one call ID data pool 134, one selective private call block instruction 136, one universal private call block instruction 137, one universal private call block override instruction 138, one custom private ID data 140, one custom private caller ID mask A 142A, one dynamic alphanumeric string 143, one custom private caller ID mask B 142B, one custom private caller ID mask N 142N, one call handling system 150, one private call blocking service 152, one fixed label 153, one static alphanumeric string 153A, one call handling command 157, one processor 154, one memory 156, one called device 160, one called party 161, one called ID data 162, one display 164, one customization message 170, one mask alteration instruction 172, one unique private caller ID 174, one redirect instruction 177, one communication device 180, one communication ID data 182, one unique private caller ID 184, one communication device 190, one communication ID data 192, and one unique private caller ID 194. It should be understood, however, that various implementations of the operating environment 100 can include zero, one, or more than one of these elements of the operating environment 100 shown in FIG. 1. As such, the illustrated embodiment of the operating environment 100 should be understood as being illustrative and should not be construed as being limiting in any way.

Turning now to FIG. 2A, an embodiment of a user interface ("UI") diagram showing an example screen display of an incoming private call without the use of the private call blocking service 152 will be discussed, according to an illustrative embodiment of the concepts and technologies described herein. FIG. 2A shows a screen display 200, which can be generated by a communication device, such as the called device 160, in response to receiving a private call, such as the call 122. In the embodiment shown in FIG. 2A, the private call blocking service 152 may not have intervened to provide a custom private caller ID mask to the called device 160, but instead sent a private call (e.g., the call 122) to the called device without sending the caller ID data 124 and without using a custom private caller ID mask. As such, the private call blocking service 152 may have sent an instance of the fixed label 153, which instructs the called device 160 to present the static alphanumeric string 153A via the display 164. In the example shown in FIG. 2A, the fixed label is configured such that the static alphanumeric string 153A presents "private incoming call" without revealing any further information or distinguishing characteristics about the private call (e.g., the call 122) being received by the called device 160. In some embodiments, the fixed label 153 may be provided to the called device 160 whenever an instance of a custom private caller ID mask is not provided or sent by the private call blocking service 152. The screen display 200 can also include an instance of an accept button 204 and an instance of a decline button 202 that can be presented on the display 164 of the called device 160. The called party 161 can provide input corresponding to the accept button 204 that enables the call 122 to be accepted, or can provide input corresponding to the decline button 202 that denies the call 122 such that the call 122 is not completed. It should be understood that the examples provided are for illustration purposes only, and therefore should not be construed as limiting in any way.

Turning now to FIGS. 2B-2D, various instances of a user interface ("UI") diagram showing an example screen display for providing selective private call blocking so as to interact with the private call blocking service 152 will be discussed, according to an illustrative embodiment of the concepts and technologies described herein. FIG. 2B shows an example screen display 250, which can be generated by a communication device (e.g., the called device 160) in response to receiving an instance of a custom private caller ID mask for a private call (e.g., the custom private caller ID mask A 142A for the call 122). In the embodiment shown in FIG. 2B, when the call 122 is sent to the called device 160, the called device 160 can present the custom private caller ID mask A 142A via the display 164. The called device 160 can present an instance of the accept button 204 and an instance of the decline button 202 on the display 164. The custom private caller ID mask A 142A can include an instance of the dynamic alphanumeric string 143. In the example embodiment shown in FIG. 2B, the dynamic alphanumeric string 143 presents "PRIVATE 00N", where "N" refers to a number assigned by the private call blocking service 152 as a default unique label for an instance of the custom private caller ID mask (e.g., the custom private caller ID mask A 142A) corresponding to the calling device 120 and the caller ID data 124. It is understood that the character "N", and thus entire instance of the dynamic alphanumeric string 143 included in the custom private caller ID mask A 142A can be unique to, and distinctly generated for, use when private calls are provided from the calling device 120 to the called device 160.

For example, in an embodiment, the calling device 120 that made the call 122 was determined by the private call blocking service 152 to correspond with the caller ID data 124 and thus the custom private caller ID mask A 142A. In an embodiment, the custom private caller ID mask A 142A may present "PRIVATE 008" each time a private call (e.g., the call 122) is received by the called device 160. If another calling party used another calling device to place another private call to the called device 160, then the private call blocking service 152 would provide a different instance of a custom private caller ID mask that may read "PRIVATE 002" for every instance the another calling device makes a private call to the called party. It should be understood that the examples provided are for illustration purposes only, and therefore should not be construed as limiting in any way. Further discussion of embodiments that enable distinction and distinguishment between private calls to enable selective private call blocking is shown and discussed with respect to FIGS. 2C-2D.

In various embodiments, an instance of a custom private caller ID mask (e.g., the custom private caller ID mask A 142A) does not enable the called device 160 to instantiate or initiate a return call to the calling device 120 based on the corresponding dynamic alphanumeric string included therein (e.g., the dynamic alphanumeric string 143 included in the custom private caller ID mask A 142A). However, an instance of a custom private caller ID mask (e.g., the custom private caller ID mask A 142A) can enable selective blocking of a private call (e.g., the call 122) via generation of an instruction (e.g., the selective private call block instruction 136) to block future private calls from a calling device 120 and/or a calling party 121 based on associating the instance of the caller ID data with the instance of the custom private caller ID mask that corresponded with the selective private call block instruction (e.g., the caller ID data 124 associated with the custom private caller ID mask A 142A that prompted or otherwise corresponded with called device sending the selective private call block instruction 136). For example, the custom private caller ID mask A 142A can include and present a selective private call block button 206, which can be presented on the display 164 to read "Block private calls from this caller" in the example shown in FIG. 2B, and also shown in FIGS. 2C-2D. It should be understood that the examples provided are for illustration purposes only, and therefore should not be construed as limiting in any way. As such, the selective private call block button 206 may present different text in various embodiments. The selective private call block button 206 can, when triggered or toggled by input from the called party 161, generate an instance of the selective private call block instruction 136 that is sent to the private call blocking service 152. The selective private call block instruction 136 can indicate or otherwise identify an association with the custom private caller ID mask A 142A. When the selective private call block instruction 136 is sent to the private call blocking service 152 in response to a custom private caller ID mask being provided with a private call instead of the caller ID data being provided (e.g., the custom private caller ID mask A 142A being provided with the call 122 instead of the caller ID data 124), the private call blocking service 152 can use to the private call blocking map 132 to identify the caller ID data 124, and in turn assign the selective private call block instruction 136 to the caller ID data 124 and the custom private caller ID mask A 142A. By this, when a future call (which is a private call) from the same calling device is detected (e.g., upon detection of the future call 129 having the caller ID data 124 from the calling device 120 and an instance of the caller ID blocking marker 126), then the private call blocking service 152 can block, redirect, or otherwise prevent the future call 129 from being provided to the called device 160 based on the selective private call block instruction 136.

In some embodiments, an instance of the custom private caller ID mask (e.g., the custom private caller ID mask A 142A) can include a private call ID options button 208. The private call ID options button 208, when triggered or toggled, can allow the called party 161 to customize the custom private caller ID mask A 142A and/or provide private call block instructions, embodiments of which are further discussed with respect to FIGS. 2C-2D. In some embodiments, when the called party 161 provides input that toggles, triggers, or otherwise corresponds with the private call ID options button 208, another screen display can be presented, such as an embodiment shown with respect to the FIGS. 2C-2D which are discussed below. It should be understood that the examples provided are for illustration purposes only, and therefore should not be construed as limiting in any way.

As shown in FIG. 2C, an example screen display 252 is shown according to an embodiment, where the screen display 252 may be generated in response to the called party 161 providing input corresponding to the private call ID options button 208 shown in FIG. 2B. In an embodiment, the called device 160 can provide an instance of private call ID options that can configure and/or customize the custom private caller ID mask A 142A. For example, in an embodiment, when the calling device 120 associated with the caller ID data 124 sends the private call (e.g., the call 122) to the called device 160, the custom private caller ID mask A 142A may present a dynamic alphanumeric string 143' that states "PRIVATE 005". In this embodiment, at least the first time that the calling device 120 places a private call to the called device 160, the custom private caller ID mask A 142A may present "PRIVATE 005" as the dynamic alphanumeric string 143'. It is understood that the dynamic alphanumeric string 143' is an embodiment of the dynamic alphanumeric string 143 and used for illustration purposes only. In an embodiment, the called party 161 may answer the private call (e.g., the call 122) that presents "PRIVATE 005" using the private custom ID mask A 142A and determine that the calling party 121 is someone known and/or otherwise trusted, such as for example, a family member, a business associate, or any other person. Although the calling party 121 may be known to the called party 161, the calling party 121 may not be authorized to reveal the caller ID data corresponding with the calling device (e.g., the caller ID data 124 corresponding with the calling device 120). For example, if the calling party 121 is the president of the United States calling from the phone in the oval office, then the calling device 120 would be the oval office phone and the caller ID data 124 corresponding to the calling device 120 may not be authorized or otherwise allowed to be revealed to the called party 161 and/or the called device 160. However, the called party 161 may want to be able to distinguish private calls that are from known callers and/or otherwise desired, from unwanted private calls that are not desired.

To distinguish and provide selective identification of private calls without possessing or revealing the caller ID data 124, in some embodiments, the called party 161 can provide input that customizes the custom private caller ID mask A 142A. For example, the called party 161 can provide input that causes the called device 160 to generate an instance of a unique private caller ID, such as a unique private caller ID 174'. The custom private caller ID mask A 142A can enable the reconfiguration of the dynamic alphanumeric string 143' based on the unique private caller ID 174' such that when a private call from the calling device 120 is sent to the called device 160 at a later point in time (e.g., the future call 129), then the custom private caller ID mask A 142A can present the unique private caller ID 174' as the dynamic alphanumeric string 143'. As previously discussed with respect to FIG. 1, when an instance of the unique private caller ID (e.g., the unique private caller ID 174') is generated to customize and reconfigure the custom private caller ID mask A 142A, the unique private caller ID 174' can cause the called device 160 to generate the mask alteration instruction 172', where the mask alteration instruction 172' is an embodiment of the mask alteration instruction 172 discussed with respect to FIG. 1. The mask alteration instruction 172' can be included in an instance of the customization message 170 that can be sent to the private call blocking service 152 so that the private call blocking service 152 can reconfigure the instance of the custom private caller ID mask A 142A stored in the communication network data store 130. By this, when the future call 129 is sent from the called device 160 that corresponds with the caller ID data 124 and the custom private caller ID mask A 142A which was reconfigured, the called device 160 can present the custom private caller ID mask A 142A that includes the unique private caller ID 174' as customized by the called party 161 (e.g., President—Oval Office). It should be understood that the examples provided are for illustration purposes only, and therefore should not be construed as limiting in any way.

In various embodiments, the private call ID options of the custom private caller ID mask A 142A may include a private call block instruction display 210. The private call block instruction display 210 can include one or more user interface buttons that cause the called device 160 to generate an instruction that is provided to the private call blocking service 152 based on the custom private caller ID mask A 142. For example, the private call block instruction display 210 can include one or more of an instance of the selective private call block button 206 (which is shown in FIGS. 2B-2D as presenting "Block private calls from this caller"), a universal private call block button 214 (which is shown in FIGS. 2C-2D as presenting "Block all private calls"), and a universal private call block override button 216 (which is shown in FIGS. 2C-2D as presenting "Exempt this private caller from universal block"). In an embodiment shown in FIG. 2C, the called party 161 can provide input that toggles, triggers, or otherwise corresponds with one or more of the universal private call block button 214 and/or the universal private call block override button 216. In response to input corresponding to the universal private call block button 214, the called device 160 can generate an instance of the universal private call block instruction 137, such as discussed with respect to FIG. 1. In response to input corresponding to the universal private call block override button 216, the called device 160 can generate an instance of the universal private call block override instruction 138, such as discussed with respect to FIG. 1. Thus, when the private call blocking service 152 receives the universal private call block override instruction 138 from the called device 160, the private call blocking service 152 will continue to provide the custom private caller ID mask A 142A to the called device 160 for future private calls (e.g., the future call 129) from the calling device 120. The custom private caller ID mask A 142A may be provided to the called device 160 irrespective of the universal private call block instruction 137 being in place because the universal private call block override instruction 138 associated with the custom private caller ID mask A 142A can override the instruction from the universal private call block instruction 137 to block or otherwise prevent any future private calls. It should be understood that the examples provided are for illustration purposes only, and therefore should not be construed as limiting in any way.

As shown in FIG. 2D, another embodiment of the screen display 252 is shown as a screen display 254, where the screen display 254 may be generated in response to the called party 161 being provided with an instance of a custom private caller ID mask for a private call from a calling device and/or calling party for which the called party 161 does not have a desire to receive or engage in private calls. For example, in various embodiments shown and discussed with respect to FIGS. 2B-2C, the called device 160 receives a private call from a calling party that reputable or otherwise is approved to participate in calls with the called device 160, despite the instance of caller ID data (e.g., the caller ID data 124) not being provided to the called device 160. However, in the embodiment shown in FIG. 2C, the called device may receive a private call from a communication device that is unknown or otherwise is not approved or trusted to be engaging in calls with the called device 160. For example, in the embodiment shown in FIG. 2C, the private call blocking service 152 may detect a private call (e.g., an instance of the call 122) and determines that the call was sent from the communication device 180 and the instance of caller ID data provided is the communication ID data 182 associated with the communication device 180. Based on the communication ID data 182 and the private call blocking map 132, the private call blocking service 152 may determine that the custom private caller ID mask B 142B should be used for the private call, and thus the custom private caller ID mask B 142B is provided to the called device 160 with the private call from the communication device 180. It is understood that the communication ID data 182 associated with the communication device 180 is prevented from being provided to the called device 160 because the private call may include an instance of the caller ID blocking marker 126. Therefore, in this embodiment, the called device 160 may present an instance of the screen display 250 shown in FIG. 2B, but instead of the custom private caller ID mask A 142A being presented, the custom private caller ID mask B 142B is presented. Because the custom private caller ID mask B 142B is used and provided to the called device 160 for any private call placed by and sent from the communication device 180, the custom private caller ID mask B 142B can instruct the called device 160 to present a dynamic alphanumeric string 143″ that provides "Private 006", according to an embodiment. It is understood that the dynamic alphanumeric string 143″ can be substantially similar to the dynamic alphanumeric strings 143 and 143′ discussed with respect to FIGS. 2B-2C, with the difference being that the dynamic alphanumeric string 143″ is unique to and/or customized for the custom private caller ID mask B 142B associated with the communication device 180. As such, the character "N" shown in FIG. 2B may be initially presented as "6" for the custom private caller ID mask B 142B. It should be understood that the examples provided are for illustration purposes only, and therefore should not be construed as limiting in any way.

In the embodiment shown in FIG. 2D, the called party 161 can provide input that customizes or otherwise reconfigures the dynamic alphanumeric string 143″, such as the unique private caller ID 184. The unique private caller ID 184 can be associated with the custom private caller ID mask B 142B such that if a private call from the communication device 180 is provided to the called device 160 in the future, then the custom private caller ID mask B 142B would be reconfigured to present the unique private caller ID 184 as the dynamic alphanumeric string 143″. As shown in FIG. 2D, the called party 161 may determine that the calling party corresponding to the communication device 180 is not authorized or otherwise approved to be sending private calls to the called device 160. For example, the input for the unique private caller ID 184 may show "person under restraining order" or any other string or text that can distinguish or denote a custom identity corresponding to the custom private caller ID mask B 142B. Therefore, in an embodiment, the called party 161 can configure the unique private caller ID 184 to reflect a unique label or identity corresponding to any future private calls that are associated with the custom private caller ID mask B 142B, and thus in turn also associated with the communication ID data 182 and the communication device 180. In some embodiments, the unique private caller ID 184 can be sent to the private call blocking service 152. For example, the called device 160 can create an instance of the customization message 170 and include an instance of the mask alteration instruction 172 that identifies the custom private caller ID mask B 142B and the unique private caller ID 184. The private call blocking service 152 can update, alter, modify, or otherwise reconfigure the instance of the custom private caller ID mask B 142B that is stored in the communication network data store 130 based on the customization message 170 and the mask alteration instruction 172 indicating the unique private caller ID 184. Thus, if private calls are allowed to continue to be provided to the called device 160 from the communication device 180, then the custom private caller ID mask B 142B would be sent to the called device 160 and present the unique private caller ID 184 as the dynamic alphanumeric string 143″. It should be understood that the examples provided are for illustration purposes only, and therefore should not be construed as limiting in any way.

In some embodiments, the calling party 161 may desire to selectively block the private call corresponding to the custom private caller ID mask B 142B. As shown in FIG. 2D, the called device 160 can present an instance of the private call block instruction display 210 that can include instances of the selective private call block button 206, the universal private call block button 214, and the universal private call block override button 216. As shown in FIG. 2D, the called party 161 may provide input that toggles, triggers, or otherwise activates the selective private call block button 206 provided by the custom private caller ID mask B 142B in order to selectively block the private call from the communication device 180. In response to selection of the selective private call block button 206, the called device can generate an instance of the selective private call block instruction 136 that indicates or otherwise is associated with the custom private caller ID mask B 142B so as to command the private call blocking service 152 to prevent future calls from the communication device 180 from being provided sent or provided to the called device 160. For example, in an embodiment, the private call blocking service 152 can assign the selective private call block instruction 136 to the custom private caller ID mask B 142B such that when a future call (e.g., a future call 129 that is from the communication device 180) is attempted or being sent to the called device 160, and where the future call 129 is a private call associated with the communication ID data 182 for the communication device 180, then the private call blocking service 152 will block or otherwise redirect the future call 129 so as not to be received by the called device 160. It should be understood that the examples provided are for illustration purposes only, and therefore should not be construed as limiting in any way.

It should be appreciated that the UI diagrams illustrated in FIGS. 2A-2D are provided for illustration purposes to provide one contemplated example of the UIs that can be generated and/or displayed in accordance with the concepts and technologies disclosed herein, and therefore should not be construed as being limited in any way. The buttons, controls, displays, and/or other information shown in the embodiments of screen displays 200, 250, 252, and 254 are illustrative and the screen displays 200, 250, 252, and 254 can include various menus, options, fields, buttons, or other information not shown in FIGS. 2A-2D. Because additional or alternative buttons and information can be included in the screen displays 200, 250, 252, and 254 it should be understood that the example embodiments shown in FIGS. 2A-2D are illustrative and therefore should not be construed as limiting in any way.

Figure 3:
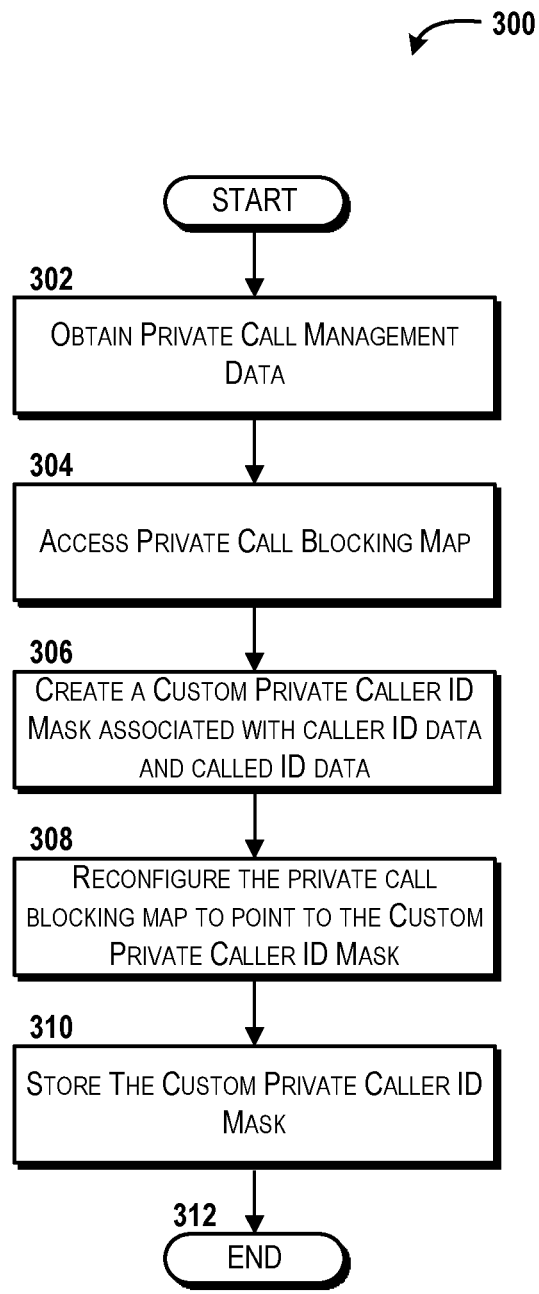
FIG. 3 is a flow diagram showing aspects of a method for generating a custom private caller identification mask for a private call blocking service, according to an illustrative embodiment of the concepts and technologies described herein.
Figure 4A:
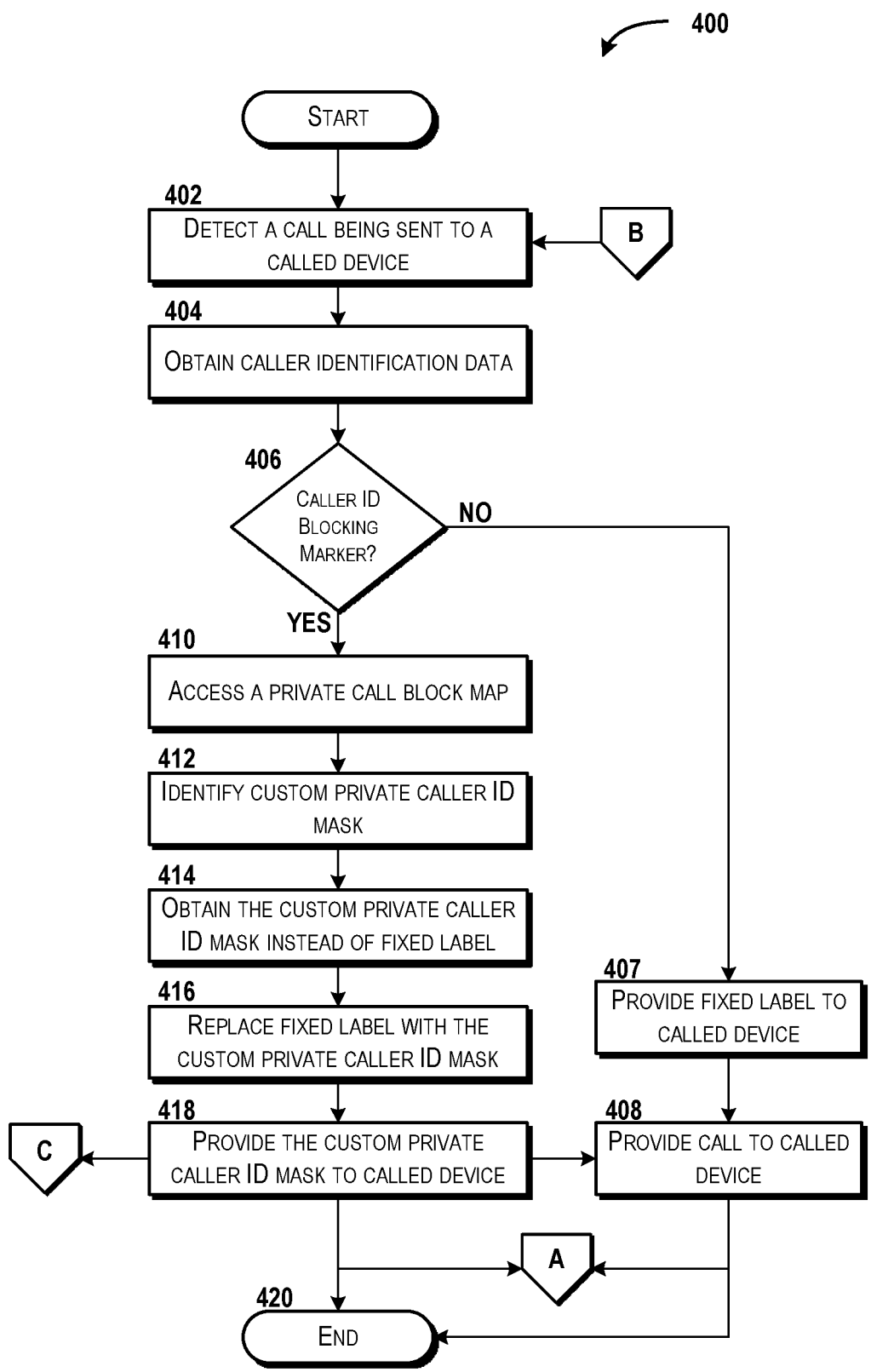
FIG. 4A is a flow diagram showing aspects of a method for providing screening and selective private call blocking using a private call blocking service, according to an illustrative embodiment of the concepts and technologies described herein.
Figure 4B:
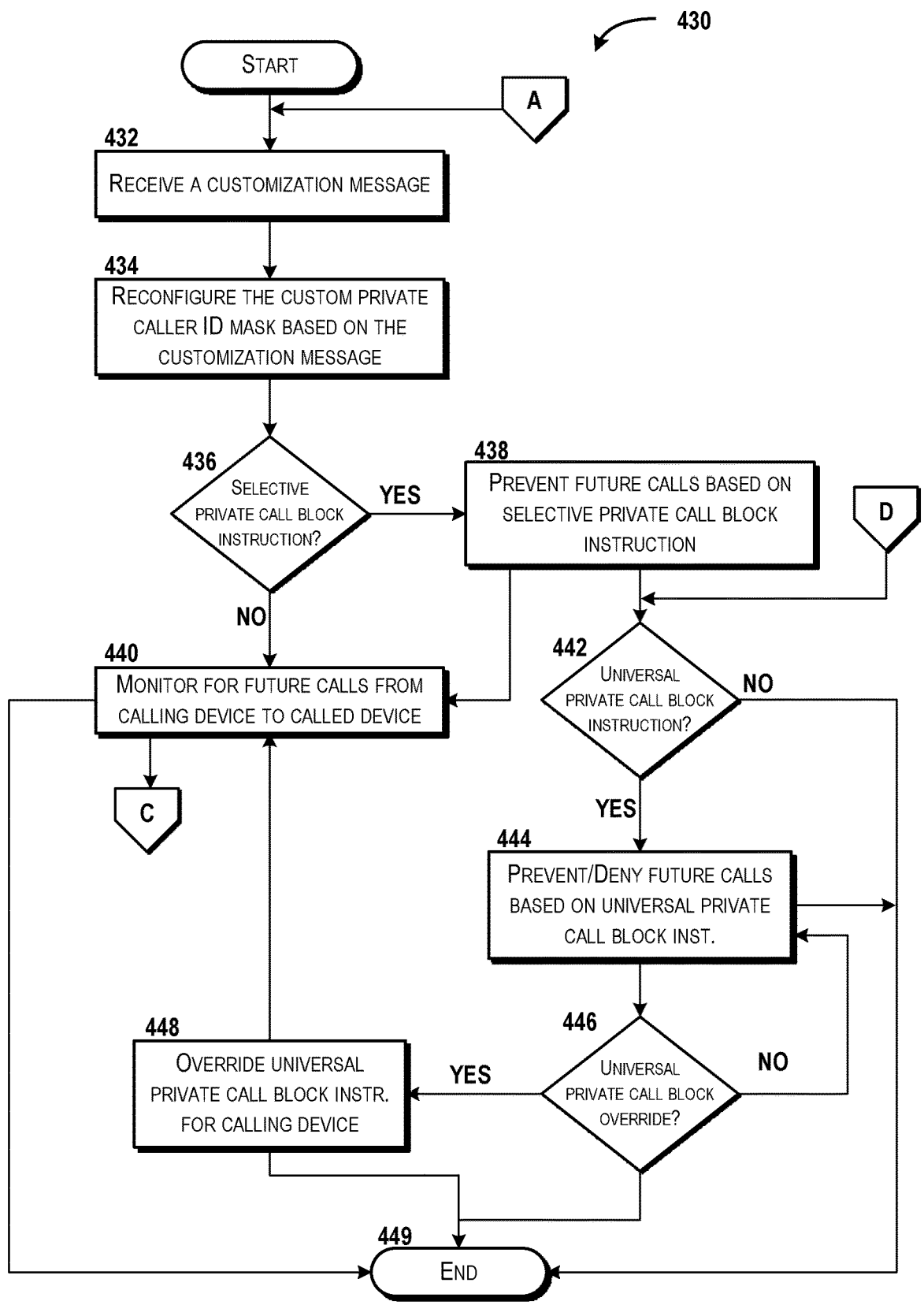
FIG. 4B is a flow diagram showing aspects of another method for providing screening and selective private call blocking using a private call blocking service, according to an illustrative embodiment of the concepts and technologies described herein.
Figure 4C:
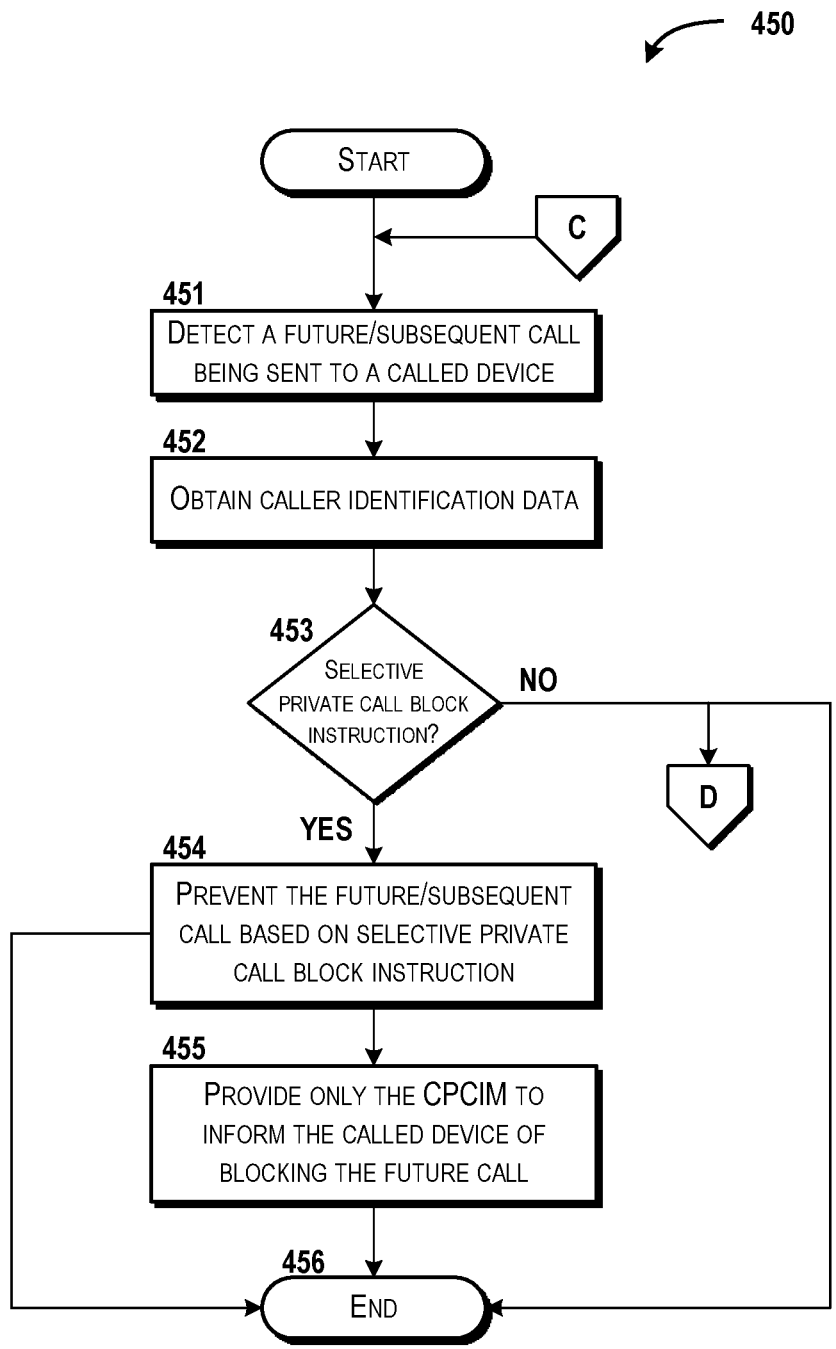
FIG. 4C is a flow diagram showing aspects of yet another method for providing screening and selective private call blocking using a private call blocking service, according to an illustrative embodiment of the concepts and technologies described herein.

Regarding FIG. 3 and FIGS. 4A-4C, aspects of methods associated with a private call blocking service, such as the private call blocking service 152, will be described in detail, according to one or more illustrative embodiment. Specifically, FIG. 3 shows a method 300 for generating an instance of a custom private caller identification mask for use with the private call blocking service 152, according to an illustrative embodiment. FIGS. 4A-4C refer to methods 400, 430, and 450, respectively, for providing selective private call blocking using the private call blocking service 152, according to one or more illustrative embodiment. It should be understood that the operations of the methods disclosed herein (e.g., the methods 300, 400, 430, and 450) are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein. It is understood that operations shown in one method may be performed in another method. It is also understood that aspects of the discussion with respect to FIG. 1 and FIGS. 2A-2D may also be included in a method, according to the concepts and technologies discussed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Therefore, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the call handling system 150, to perform one or more operations and/or causing the processor to direct other components of the computing system or device to perform one or more of the operations.

For purposes of illustrating and describing the concepts of the present disclosure, the method 300 disclosed herein is described as being performed by the call handling system 150 via execution of one or more computer-readable instructions such as, for example, the private call blocking service 152 that configure one or more processors, such as one or more instances of the processor 154. It should be understood that additional and/or alternative devices can provide the functionality described herein via execution of one or more modules, applications, and/or other software including, but not limited to, the private call management application 114 that can execute and configure a device, such as but not limited to, the user device 110, the called device 160, the communication device 180, and/or the communication device 190. Thus, the illustrated embodiments are illustrative, and should not be viewed as being limiting in any way.

Turning now to FIG. 3, aspects of the method 300 aspects for generating an instance of a custom private caller identification mask to support selective private call blocking will be discussed, according to an embodiment. The method 300 can begin and proceed to operation 302, where the private call blocking service 152 can obtain an instance of the private call management data 116. In some embodiments, the private call management data 116 can indicate that a communication device (e.g., the called device 160) authorizes the use of the private call blocking service 152 to enable selective blocking of private calls, such as the call 122. In some embodiments, the private call management data 116 can include an instance of the custom private ID data 140. The custom private ID data 140 can indicate or otherwise identify the communication device for which one or more instances of a custom private caller ID mask should be generated. For example, the custom private ID data 140 can indicate that the called device 160 associated with the called ID data 162 participates in the private call blocking service 152 and therefore should receive an instance of a custom private caller ID mask instead of the fixed label 153 having the static alphanumeric string 153A that is conventionally provided with private calls (e.g., the call 122).

From operation 302, the method 300 may proceed to operation 304, where the private call blocking service 152 can access the private call blocking map 132. For example, the private call blocking service 152 can retrieve and access the private call blocking map 132 from the communication network data store 130. From operation 304, the method 300 may proceed to operation 306, where the private call blocking service 152 can create a custom private caller ID mask that is associated with an instance of caller ID data and an instance of called ID data. For example, the private call blocking service 152 can create an instance of the custom private caller ID mask A 142A that associates the caller ID data 124 and the called ID data 162 such that when a private call is detected and determined to be coming from a communication device associated with the caller ID data 124 (e.g., the calling device 120) and being sent to the called device 160 associated with called ID data 162, then the custom private caller ID mask A 142A is to be provided to the called device 160 instead of the caller ID data 124 and/or the fixed label 153. The private call blocking service 152 can assign a default unique label to the custom private caller ID mask A 142 in the format of the dynamic alphanumeric string 143. As such, the instance of the dynamic alphanumeric string 143 of the custom private caller ID mask A 142A can present a default label that is unique to the caller ID data 124, but does not reveal the caller ID data 124 and is not the same as the static alphanumeric string 153A of the fixed label 153. For example, when the custom private caller ID mask A 142A is first provided to the called device 160, the called device 160 may present "Private 005" as the dynamic alphanumeric string 143 of the custom private caller ID mask A 142A. It is understood that for other instances of a custom private caller ID mask that are created (e.g., the custom private caller ID mask B 142B), the association that is reflected can be between the communication ID data 182 (which would be considered an instance of caller ID data) associated with the communication device 180 and the called ID data 162 associated with the called device 160. Therefore, the custom private caller ID mask B 142B may present "Private 006" based on a uniquely created instance of the dynamic alphanumeric string of the custom private caller ID mask B 142B. It should be understood that the examples provided are for illustration purposes only, and therefore should not be construed as limiting in any way.

It is understood that the default unique label that is used for an instance of the dynamic alphanumeric string 143 may depend on the numbers that have already been assigned for use with other custom private caller ID masks. For example, if the custom private caller ID mask A 142A has already been created and configured to present "Private 005", and the custom private caller ID mask B 142B has already been created and configured to present "Private 006", then the private call blocking service 152 can use the next available increment (e.g., "Private 007") for the default unique label assigned to the dynamic alphanumeric string 143 for a newly created custom private caller ID mask. It is understood that the default unique label is not limited to use of the phrase "Private 00N", but instead can include any information that can be unique to the caller ID data 124 without providing or otherwise revealing the caller ID data 124 so as to prevent a return call from being placed based on the instance of the custom private caller ID mask being created. It should be understood that the examples provided are for illustration purposes only, and therefore should not be construed as limiting in any way.

From operation 306, the method 300 may proceed to operation 308, where private call blocking service 152 can reconfigure the private call blocking map 132 to point to the custom private caller ID mask that was created, such as the custom private caller ID mask A 142A. By this, the when the private call blocking service 152 at a later time accesses the private call blocking map 132, the private call blocking service 152 can use information from a detected private call (e.g., the called ID data 162 and/or the caller ID data 124) to determine which custom private caller ID mask should be used, such as the custom private caller ID mask A 142A that corresponds with the called ID data 162 and the caller ID data 124. Therefore, when the called ID data 162 and the caller ID data 124 are presented to the private call blocking map 132, the reconfiguration of the private call blocking map 132 can point to the custom private caller ID mask A 142A which can be provided to the called device 160 for the call 122 instead of the caller ID data 124 and/or the fixed label 153.

From operation 308, the method 300 may proceed to operation 310, where the private call blocking service 152 can store the custom private caller ID mask A 142A for later retrieval and/or use with a private call. From operation 310, the method 300 may proceed to operation 312, where the method 300 may end. In some embodiments, from operation 310, the method 300 may proceed to one or more operations discussed with respect to FIGS. 4A-4C, according to an embodiment. It should be understood that these examples are illustrative and therefore should not be construed as being limiting in any way.

Turning now to FIG. 4A, aspects of the method 400 for providing screening and selective private call blocking using a private call blocking service will be discussed, according an embodiment. The method 400 can begin and proceed to operation 402, where the private call blocking service 152 can execute on the processor 154 of the call handling system 150 and detect a call from a calling device directed to a called device. For example, the private call blocking service 152 can detect that the call 122 from the calling device 120 that is being sent to the called device 160. From operation 402, the method 400 may proceed to operation 404, where the private call blocking service 152 can obtain caller ID data corresponding with the call 122. For example, the call 122 can include or otherwise be associated with the caller ID data 124. From operation 404, the method 400 may proceed to operation 406, where the private call blocking service 152 can determine whether the call is a private call, such as based on determining whether a caller ID blocking marker is present or otherwise indicated. For example, the private call blocking service 152 can determine whether the call 122 has or otherwise indicates the caller ID blocking marker 126, which can indicate that the call 122 should be treated as a private call. The caller ID blocking marker 126 can indicate that a fixed label (e.g., the fixed label 153 which is not unique to the caller ID data 124, the called ID data 162, the calling device 120, or the called device 160) should be provided to the called device 160 so as to prevent the called device 160 from receiving and/or presenting the caller ID data 124 associated with the calling device 120. In some embodiments, the caller ID blocking marker may indicate or otherwise identify the fixed label 153 that should be provided to the called device 160 instead of the caller ID data 124, where the fixed label 153 can be configured to indicate the one or more of "private", "anonymous", "unknown", or "unavailable" via the static alphanumeric string 153A. The fixed label 153 is not uniquely generated, created, and/or provided to the called device 160 based on the called ID data 162, the caller ID data 124, the called device 160, and/or the calling device 120.

In an embodiment, if the private call blocking service 152 determines that the caller ID blocking marker 126 is not present with the call 122, then the call 122 would not be treated as a private call and the method 400 may proceed along the NO path to operation 407, where the private call blocking service 152 may provide the fixed label 153 to the called device 160 instead of the caller ID data 124, where the fixed label 153 is not uniquely created for the called device 160. From operation 407, the method 400 may proceed to operation 408, where the call 122 can be provided to the called device 160. From operation 408, the method 400 may proceed to operation 420, where the method 400 can end. In some embodiments, the method 400 may proceed from operation 408 to operation 432, which is discussed below with respect to the method 430 shown in FIG. 4B.

Returning to operation 406, if the private call blocking service 152 determines that the caller ID blocking marker 126 is present with the call 122, then the call 122 would not be treated as a private call and the method 400 may proceed along the YES path to operation 410. At operation 410, the private call blocking service 152 can access the private call blocking map 132 in the communication network data store 130 or other memory.

From operation 410, the method 400 may proceed to operation 412, where the private call blocking service 152 can identify, using the private call blocking map 132, the custom private caller ID mask that corresponds and/or is otherwise based on called ID data 162 associated with the called device 160 and/or the caller ID data 124 associated with the calling device 120. For example, the private call blocking service 152 may identify that the custom private caller ID mask A 142A corresponds with the called ID data 162 and the caller ID data 124, and therefore should be used instead of the fixed label 153. It should be understood that the examples provided are for illustration purposes only, and therefore should not be construed as limiting in any way.

From operation 412, the method 400 may proceed to operation 414, where the private call blocking service 152 can obtain the custom private caller ID mask A 142A for the call 122 instead of obtaining the fixed label 153 for the call 122. From operation 414, the method 400 may proceed to operation 416, where the private call blocking service 152 can replace the use of the fixed label 153 for the call 122 with the custom private caller ID mask A 142A that is uniquely generated for the called device 160. From operation 416, the method 400 may proceed to operation 418, where the private call blocking service 152 can provide the custom private caller ID mask A 142A to the called device 160 for the call 122. the custom private caller identification mask is presented to a called party associated with the called device without revealing the caller identification data.

From operation 418, the method 400 may proceed to operation 420, where the method 400 can end. In some embodiments, the method 400 may proceed from operation 418 to operation 408, where the call 122 can be provided to the called device 160. In some embodiments, the method 400 may proceed from operation 418 to operation 432, which is discussed with respect to the method 430 shown in FIG. 4B and discussed below. In some embodiments, the method 400 may proceed from operation 418 to operation 451, which is discussed with respect to the method 450 shown in FIG. 4C and discussed below. It should be understood that these examples are illustrative and therefore should not be construed as being limiting in any way.

Turning now to FIG. 4B, aspects of the method 430 for providing screening and selective private call blocking using a private call blocking service will be discussed, according another embodiment. It is understood that, in some embodiments, the method 430 may be performed with the method 400.

The method 430 can begin and proceed to operation 432, where the private call blocking service 152 can receive the customization message 170 that can include the mask alteration instruction 172 that can configure the custom private caller ID mask A 142A to present the unique private caller ID 174 on the called device 160 for future calls (e.g., the future call 129) made by the calling device 120 and directed to the called device 160. In some embodiments, the customization message 170 may be generated by the called device 160 in response to the private call blocking service 152 providing the custom private caller ID mask A 142A to the called device 160 for the call 122.

From operation 432, the method 430 may proceed to operation 434, where the private call blocking service 152 can reconfigure the custom private caller ID mask A 142A based on the customization message 170. For example, the mask alteration instruction 172 can instruct the private call blocking service 152 to update, modify, or otherwise alter the default unique label of the dynamic alphanumeric string 143 with the unique private caller ID 174 such that the next time that the custom private caller ID mask A 142A is provided to the called device 160 with the future call 129, the custom private caller ID mask A 142A present the unique private caller ID 174 without revealing or providing the caller ID data 124, and therefore preventing or not allowing the called device 160 to engage in a return call to the calling device 120 based on the unique private caller ID 174 of the custom private caller ID mask A 142A.

From operation 434, the method 430 may proceed to operation 436, where the private call blocking service 152 can determine whether an instance of the selective private call block instruction 136 has been received based on the custom private caller ID mask A 142A. The selective private call block instruction 136 can indicate that future incoming calls (e.g., the future call 129) from the calling device 120 associated with the caller ID data 124 should be prevented from reaching the called device 160. The future call 129 can be a private call based on it having an instance of the caller ID blocking marker 126. Thus, if the selective private call block instruction 136 corresponds with the custom private caller ID mask A 142A, then the future call 129 would be prevented from being sent to the called device 160.

In an embodiment, the private call blocking service 152 may determine that the called device has not provided an instance of the selective private call block instruction 136 corresponding to the custom private caller ID mask A 142A, and as such, the method 430 may proceed from operation 436 along the NO path to operation 440. At operation 440, the private call blocking service 152 can monitor for future calls (e.g., the future call 129) from the calling device 120 to the called device 160. In an embodiment, from operation 440, the method 430 may proceed to operation 449 where the method 430 may end. In another embodiment, the method 430 may proceed from operation 440 to operation 451, which is discussed with respect to FIG. 4C below.

Returning to operation 436, in an embodiment, the private call blocking service 152 can determine that the called device 160 provided the selective private call block instruction 136 based on the custom private caller ID mask A 142A, and therefore the method 430 can proceed along the YES path to operation 438.

At operation 438, the private call blocking service 152 can prevent future calls (e.g., the future call 129), which are sent from the calling device 120 to the called device 160, from being provided to the called device 160 based on the selective private call block instruction 136. In some embodiments, the method 400 may proceed from operation 438 to operation 440, where the private call blocking service 152 can monitor for future calls (e.g., the future call 129) from the calling device 120 to the called device 160. In some embodiments, the method 430 may proceed from operation 438 to operation 442.

At operation 442, the private call blocking service 152 can determine whether an instance of the universal private call block instruction 137 has been provided by the called device 160. If the universal private call block instruction 137 has been provided by the called device 160, then the method 430 may proceed from operation 442 along the NO path to operation 449, where the method 430 may end.

Returning to operation 442, if the private call blocking service 152 determines that the universal private call block instruction 137 has been provided by the called device 160, then the method 430 may proceed from operation 442 along the YES path to operation 444. At operation 444, the private call blocking service 152 may prevent and/or deny future calls (e.g., the future call 129) from being provided to the called device 160 based on the universal private call block instruction 137. In some embodiments, the method 430 may proceed from operation 444 to operation 449, where the method 430 can end. In some embodiments, the private call blocking service 152 may determine whether any exemptions or exceptions are provided such that one or more calls may proceed despite the universal private call block instruction 137, and therefore may proceed to operation 446.

At operation 446, the private call blocking service 152 can determine whether an instance of the universal private call block override instruction 138 has been provided by the called device 160. For example, the private call blocking service 152 may determine whether the called device 160 and/or the custom private caller ID mask A 142A is associated with the universal private call block instruction 137 and/or the universal private call block override instruction 138, where the universal private call block instruction 137 indicates that incoming calls that have the caller ID blocking marker 126 should be prevented from being provided to the called device unless the selective private call block override instruction 138 exists for the custom private caller ID mask A 142A, where the selective private call block override instruction 138 allows the future call (e.g., the future call 129) to proceed to the called device 160 using the custom privet caller ID mask A 142A despite the future call 129 having the caller ID blocking marker 126.

In some embodiments, if the private call blocking service 152 determines that the universal private call block override instruction 138 has not been provided, then the method 430 may proceed from operation 446 along the NO path to operation 444, where the private call blocking service 152 can prevent future calls that are private calls from reaching the called device 160. In some embodiments, if the private call blocking service 152 determines that the universal private call block override instruction 138 has been provided for the custom private caller ID mask A 142A, then the method 430 may proceed from operation 446 along the YES path to operation 448.

At operation 448, the private call blocking service 152 can override the universal private call block instruction 137 so as to exempt the custom private caller ID mask A 142A from the universal private call block instruction 137 and allow future calls that are private calls (e.g., the future call 129) to reach the called device 160 based on the universal private call block override instruction 138.

From operation 448, the method 430 may proceed to operation 440, which is discussed above. In some embodiments, the method 430 may proceed from operation 440 to operation 451, which is discussed with respect to the method 450 shown in FIG. 4C below.

Turning now to FIG. 4C, aspects of a method 450 for providing screening and selective private call blocking using a private call blocking service will be discussed, according yet another embodiment. In some embodiments, the method 450 may proceed from one or more operations discussed with respect to the method 400 and/or the method 430. In some embodiments, the method 450 can begin and proceed to operation 451, where the private call blocking service 152 can detect the future call 129 from the calling device 120 directed to the called device 160.

From operation 451, the method 450 may proceed to operation 452, where the private call blocking service 152 can obtain and/or identify the caller ID data 124 corresponding to the future call 129. The private call blocking service 152 can determine that the custom private caller ID mask A 142A is associated with the caller ID data 124.

From operation 452, the method 450 may proceed to operation 453, where the private call blocking service 152 may determine whether an instance of the selective private call block instruction 136 corresponds with the custom private caller ID mask A 142A. In some embodiments, if the private call blocking service 152 determines that an instance of the selective private call block instruction 136 has not been provided to the private call blocking service 152 based on the custom private caller ID mask A 142A being provided to the called device 160 with the call 122, then the method 450 can proceed along the NO path. In some embodiments, the method 450 may proceed along the NO path to operation 442 discussed with respect to the method 430 shown in FIG. 4B. In some embodiments, the method 450 may proceed along the NO path to operation 456, where the method 450 may end.

Returning to operation 453, in some embodiments, if the private call blocking service 152 determines that an instance of the selective private call block instruction 136 has been provided to the private call blocking service 152 based on the custom private caller ID mask A 142A being provided to the called device 160 with the call 122, then the method 450 may proceed along the YES path to operation 454. At operation 454, the private call blocking service 152 prevents the future call 129 from being provided to the called device 160 based on the selective private call block instruction 136. In some embodiments, the method 450 may proceed from operation 454 to operation 456, where the method 450 can end. In some embodiments, the method 450 may proceed from operation 454 to operation 455.

At operation 455, the private call blocking service 152 can prevent the future call 129 from being provided to the called device 160 but continue to provide the custom private caller ID mask A 142A to the called device 160 so as to inform the called device 160 that the future call 129 was blocked based on the selective private call block instruction 136. From operation 455, the method 450 may proceed to operation 456, where the method 450 can end.

Figure 5:
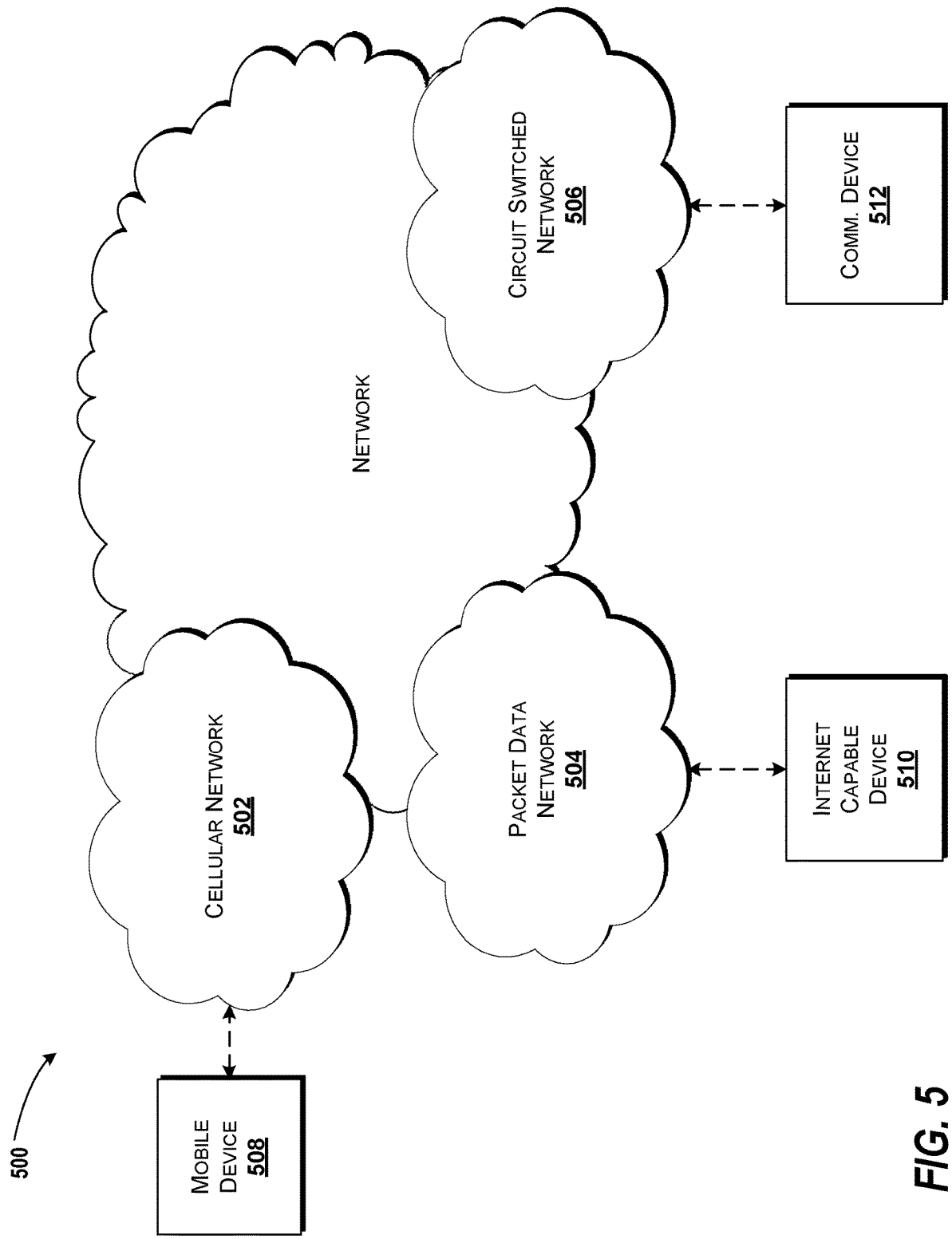
FIG. 5 schematically illustrates a network, according to an illustrative embodiment of the concepts and technologies described herein.

Turning now to FIG. 5, a discussion of a network 500 is illustrated, according to an illustrative embodiment. The network 102 shown in FIG. 1 can be configured substantially similar to include at least some of the elements of the network 500. The network 500 can include a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also can be compatible with mobile communications standards such as but not limited to 4G, LTE, LTE Advanced, and/or 5G, as well as evolved and future mobile standards.

The packet data network 504 includes various devices, for example, servers, computers, databases, and other devices in communication with one another, as is generally understood. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" and/or "pointers" in the retrieved files, as is generally understood. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 102 and/or the network 500 refers broadly to any combination of the networks 502, 504, 506. It should be appreciated that substantially all of the functionality described with reference to the network 102 and/or the network 500 can be performed by the cellular network 502, the packet data network 504, and/or the circuit switched network 506, alone or in combination with other networks, network elements, and the like. Although not illustrated separately in FIG. 5, it should be understood that the IMS 104 can be a part of the cellular network 502, though this is not necessarily the case.

Figure 6:
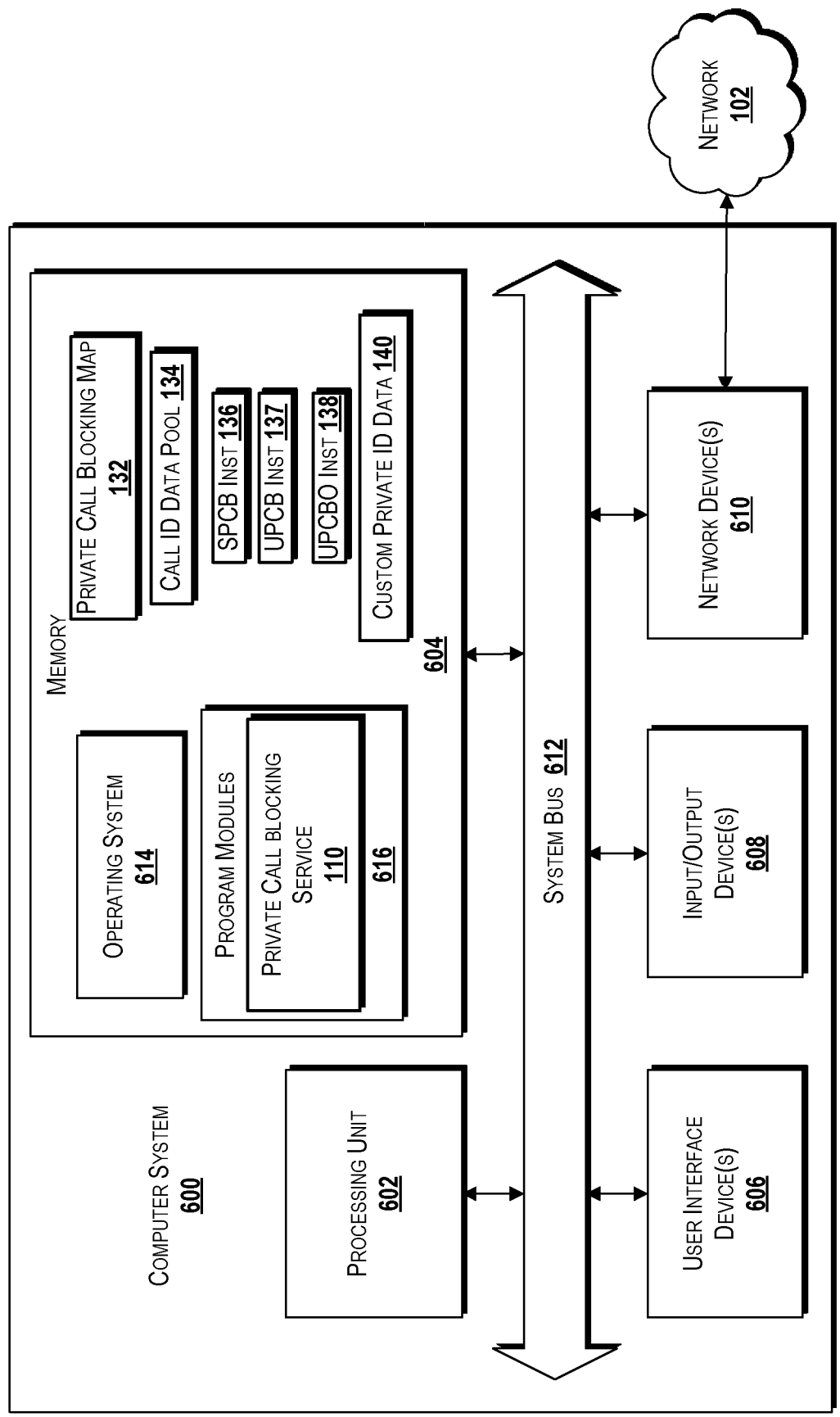
FIG. 6 is a block diagram illustrating an example computer system configured to provide, implement, and/or otherwise support private a call blocking service, according to some illustrative embodiments of the concepts and technologies described herein.

FIG. 6 is a block diagram illustrating a computer system 600 configured to provide the functionality described herein for providing and using a private call blocking service, such as the private call blocking service 152, in accordance with various embodiments of the concepts and technologies disclosed herein. In aspects, the call handling system 150 illustrated and described herein can be configured as and/or can have an architecture similar or identical to the computer system 600. In some embodiments, the user device 110 can be configured as and/or have an architecture that is similar or identical to the computer system 600. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, the processor 154 can be configured substantially similar to the processing unit 602. In some embodiments, the memory 156 can be configured substantially similar to the memory 604.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the private call management application 114, the private call blocking service 152, and/or other computer-readable instructions. These and/or other programs can be embodied in computer-readable media containing instructions that, when executed by the processing unit 602, perform one or more of the methods 300, 400, 430, and 450 described in detail above with respect to FIGS. 3 and 4A-4C. According to some embodiments, the program modules 616 may be embodied in hardware, software, firmware, or any combination thereof. It should be understood that the memory 604 also can be configured to store one or more instance of information discussed with respect to FIG. 1 and FIGS. 2A-2D, such as but not limited to the private call blocking map 132, the call ID data pool 134, the selective private call block instruction 136, the universal private call block instruction 137, the universal private call block override instruction 138, the custom private ID data 140, one or more instances of a custom private caller ID mask, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrases "memory", "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 102. Examples of the network devices 610 include, but are not limited to, a modem, a radio frequency ("RF") or infrared ("IR") transceiver, a telephonic interface, a bridge, a router, or a network card. The network 102 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 102 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
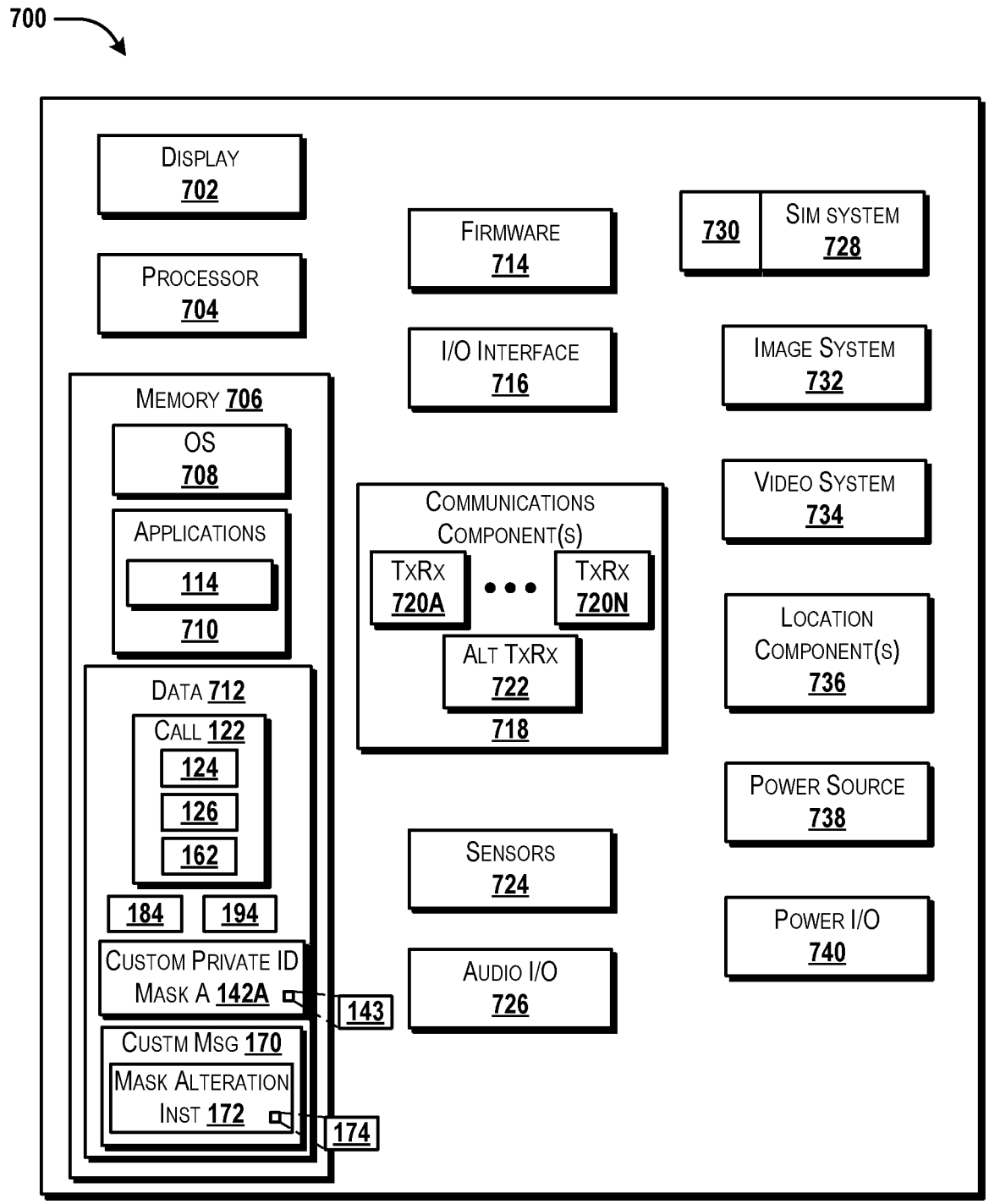
FIG. 7 is a block diagram illustrating an example communication device configured to interact with a private call blocking service, according to some illustrative embodiments of the concepts and technologies described herein.

Turning now to FIG. 7, an illustrative communication device 700 and components thereof will be described. In some embodiments, the user device 110, the called device 160, the calling device 120, the communication device 180, the communication device 190, and/or other devices illustrated and described herein can be configured as and/or can have an architecture similar or identical to the communication device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the communication device 700 can include a display 702 for presenting data and information. According to various embodiments, the display 702 can be configured to display various graphical user interface ("GUI") elements for presenting and/or modifying information associated with a custom private caller ID mask, creating private call instructions, presenting text, images, video, virtual keypads and/or keyboards, messaging data, notification messages, metadata, internet content, device status, time, date, calendar data, device preferences, map and location data, combinations thereof, and/or the like. The communication device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the private call management application 114, some of the private call blocking service 152, and/or other computer-executable instructions stored in a memory 706, or the like. In some embodiments, the applications 710 also can include a UI application (not illustrated in FIG. 7).

The UI application can interface with the operating system 708, such as the operating system 112 shown in FIG. 1, to facilitate user interaction with functionality and/or data stored at the communication device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, displaying a custom private caller ID mask (e.g., the custom private caller ID mask A 142A), configuring settings, manipulating address book content and/or settings, multimode interaction, interacting with other applications 710, and otherwise facilitating user interaction with the operating system 708, the applications 710, and/or other types or instances of data 712 that can be stored at the communication device 700, such as stored by the memory 706. According to various embodiments, the data 712 can include, for example, instances of a call (e.g., the call 122), the caller ID data 124, the caller ID blocking marker 126, the called ID data 162, the unique private caller ID 184, the unique private caller ID 194, the unique private caller ID 174, the mask alteration instruction 172, the customization message 170, the custom private caller ID mask A 142A, the dynamic alphanumeric string 143, any other elements discussed with respect to FIG. 1 and FIGS. 2A-2D, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The communication device 700 also can include an input/output ("I/O") interface 716. The I/O interface 716 can be configured to support the input/output of data such as the call 122, the customization message 170, the mask alteration instruction 172, the custom private caller ID mask A 142A, other information discussed with respect to FIG. 1, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the communication device 700 can be configured to synchronize with another device to transfer content to and/or from the communication device 700. In some embodiments, the communication device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the communication device 700 and a network device or local device.

The communication device 700 also can include a communications component 718. The communications component 718 can be configured to interface with the processor 704 to facilitate wired and/or wireless communications with one or more networks such as the network 102 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks. The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, 5G, LTE, LTE Advanced, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The communication device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the communication device 700 may be provided by an audio I/O component 726. The audio I/O component 726 of the communication device 700 can include one or more speakers for the output of audio signals, one or more microphones for the collection and/or input of audio signals, and/or other audio input and/or output devices.

The illustrated communication device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the communication device 700 are contemplated, it should be understood that these embodiments are illustrative, and should not be construed as being limiting in any way.

The communication device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The communication device 700 may also include a video system 734. The video system 734 can be configured to capture, process, record, modify, and/or store video content. Photos and videos obtained using the image system 732 and the video system 734, respectively, may be added as message content to an MMS message, email message, and sent to another communication device. The video and/or photo content also can be shared with other devices via various types of data transfers via wired and/or wireless communication devices as described herein.

The communication device 700 also can include one or more location components 736. The location components 736 can be configured to send and/or receive signals to determine a geographic location of the communication device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the communication device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the communication device 700. Using the location component 736, the communication device 700 can generate and/or receive data to identify its geographic location, or to transmit data used by other devices to determine the location of the communication device 700. The location component 736 may include multiple components for determining the location and/or orientation of the communication device 700.

The illustrated communication device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the communication device 700 can include additional and/or alternative components, the above embodiment should be understood as being illustrative of one possible operating environment for various embodiments of the concepts and technologies described herein. The described embodiment of the communication device 700 is illustrative, and should not be construed as being limiting in any way.

Based on the foregoing, it should be appreciated that systems and methods for providing and using a private call blocking service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or medium described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
   detecting, by a processor of a call handling system server within a communications network, a call being routed across the communications network from a calling device directed to a called device, wherein the calling device is associated with a calling party that directed placement of the call;
   determining, by the processor of the call handling system server within the communications network, that the call has a caller identification blocking marker, wherein the caller identification blocking marker requests
      that a name and a phone number from caller identification data associated with the call should be prevented from being sent to the called device, and
      that a fixed label should be provided to the called device instead of allowing the name and the phone number of the caller identification data associated with the call to be provided to the called device, wherein the fixed label does not present an identification of the calling party to the called device and the fixed label is not uniquely created for the called device; and
   in response to determining that the call has the caller identification blocking marker and before the call reaches the called device,
      blocking, by the processor of the call handling system server, the fixed label and the phone number of the caller identification data from being provided to the called device for the call,
      obtaining, by the processor of the call handling system server, a custom private caller identification mask for the call instead of the fixed label that was requested by the caller identification blocking marker, wherein the custom private caller identification mask is configured to allow identification of the calling party and to prevent the called device from establishing a return call to the calling device by blocking the phone number of the calling device from being provided to the called device, and wherein the custom private caller identification mask is generated uniquely and distinctly for the called device so as to allow identification of calls having the caller identification blocking marker from the calling party that are directed to the called device, and
      providing, by the processor of the call handling system server, the custom private caller identification mask to the called device for the call so as to identify the calling party without revealing the phone number of the calling device from the caller identification data associated with the calling device, wherein the custom private caller identification mask is presented to a called party via the called device.

2. The method of claim 1, further comprising:
   accessing, by the processor, a private call blocking map; and
   identifying, by the processor, the custom private caller identification mask within the private call blocking map based on called party identification data associated with the called device.

3. The method of claim 1, wherein the fixed label is configured to indicate one or more of private, anonymous, unknown, or unavailable.

4. The method of claim 1, further comprising replacing, by the processor of the call handling system server, for the call, the fixed label with the custom private caller identification mask.

5. The method of claim 1, further comprising receiving, by the processor, a customization message that comprises a mask alteration instruction that configures the custom private caller identification mask to present a unique private caller identification on the called device for calls made by the calling device.

6. The method of claim 1, further comprising:
determining, by the processor, that the called device has provided a selective private call block instruction for future calls corresponding to the custom private caller identification mask; and
preventing, by the processor, the future calls from being provided to the called device based on the selective private call block instruction.

7. The method of claim 1, wherein the custom private caller identification mask comprises instructions that direct the called device to store the custom private caller identification mask in an address book of the called device.

8. A system comprising:
a processor; and
a memory that stores computer-executable instructions that, in response to being executed by the processor, cause the processor to perform operations comprising
detecting a call being routed across a communications network from a calling device directed to a called device, wherein the calling device is associated with a calling party that directed placement of the call,
determining that the call has a caller identification blocking marker, wherein the caller identification blocking marker requests
that a name and a phone number from caller identification data associated with the call should be prevented from being sent to the called device, and
that a fixed label should be provided to the called device instead of allowing the name and the phone number of the caller identification data associated with the call to be provided to the called device, wherein the fixed label does not present an identification of the calling party to the called device and the fixed label is not uniquely created for the called device, and
in response to determining that the call has the caller identification blocking marker and before the call reaches the called device,
blocking the fixed label and the phone number of the caller identification data from being provided to the called device for the call,
obtaining a custom private caller identification mask for the call instead of the fixed label that was requested by the caller identification blocking marker, wherein the custom private caller identification mask is configured to allow identification of the calling party and to prevent the called device from establishing a return call to the calling device by blocking the phone number of the calling device from being provided to the called device, and wherein the custom private caller identification mask is generated uniquely and distinctly for the called device so as to allow identification of calls having the caller identification blocking marker from the calling party that are directed to the called device, and
providing the custom private caller identification mask to the called device for the call so as to identify the calling party without revealing the phone number of the calling device from the caller identification data associated with the calling device, wherein the custom private caller identification mask is presented to a called party via the called device.

9. The system of claim 8, wherein the operations further comprise:
accessing a private call blocking map; and
identifying the custom private caller identification mask within the private call blocking map based on called party identification data associated with the called device.

10. The system of claim 8, wherein the fixed label is configured to indicate one or more of private, anonymous, unknown, or unavailable.

11. The system of claim 8, wherein the operations further comprise replacing, for the call, the fixed label with the custom private caller identification mask.

12. The system of claim 8, wherein the operations further comprise receiving a customization message that comprises a mask alteration instruction that configures the custom private caller identification mask to present a unique private caller identification on the called device for calls made by the calling device.

13. The system of claim 8, wherein the operations further comprise:
determining that the called device has provided a selective private call block instruction for future calls corresponding to the custom private caller identification mask; and
preventing the future calls from being provided to the called device based on the selective private call block instruction.

14. The system of claim 8, wherein the custom private caller identification mask comprises instructions that direct the called device to store the custom private caller identification mask in an address book of the called device.

15. A computer storage medium having computer-executable instructions stored thereon that, in response to execution by a processor of a call handling system server, cause the processor to perform operations comprising:
detecting a call being routed across a communications network from a calling device directed to a called device, wherein the calling device is associated with a calling party that directed placement of the call;
determining that the call has a caller identification blocking marker, wherein the caller identification blocking marker requests
that a name and a phone number from caller identification data associated with the call should be prevented from being sent to the called device, and
that a fixed label should be provided to the called device instead of allowing the name and the phone number of the caller identification data associated with the call to be provided to the called device, wherein the fixed label does not present an identification of the calling party to the called device and the fixed label is not uniquely created for the called device; and
in response to determining that the call has the caller identification blocking marker and before the call reaches the called device, blocking the fixed label and the phone number of the caller identification data from being provided to the called device for the call, obtaining a custom private caller identification mask for the call instead of the fixed label that was requested by the caller identification blocking marker, wherein the custom private caller identification mask is configured to allow identification of the calling party and to prevent the called device from establishing a return call to the calling device by blocking the phone number of the calling device from being provided to the called device, and wherein the custom private caller identification mask is generated uniquely and distinctly for the called device so as to allow identification of calls having the caller identification blocking marker from the calling party that are directed to the called device, and providing the custom private caller identification mask to the called device for the call so as to identify the calling party without revealing the phone number of the calling device from the caller identification data associated with the calling device, wherein the custom private caller identification mask is presented to a called party via the called device.

16. The computer storage medium of claim 15, wherein the operations further comprise:

accessing a private call blocking map; and identifying the custom private caller identification mask within the private call blocking map based on called party identification data associated with the called device.

17. The computer storage medium of claim 15, wherein the fixed label is configured to indicate one or more of private, anonymous, unknown, or unavailable.

18. The computer storage medium of claim 15, wherein the operations further comprise replacing, for the call, the fixed label with the custom private caller identification mask.

19. The computer storage medium of claim 15, wherein the operations further comprise receiving a customization message that comprises a mask alteration instruction that configures the custom private caller identification mask to present a unique private caller identification on the called device for calls made by the calling device.

20. The computer storage medium of claim 15, wherein the operations further comprise:

determining that the called device has provided a selective private call block instruction for future calls corresponding to the custom private caller identification mask; and preventing the future calls from being provided to the called device based on the selective private call block instruction.

* * * * *